United States Patent
Chen et al.

(10) Patent No.: US 9,521,425 B2
(45) Date of Patent: Dec. 13, 2016

(54) DISPARITY VECTOR DERIVATION IN 3D VIDEO CODING FOR SKIP AND DIRECT MODES

(71) Applicant: QUALCOMM Incorporated, San Diego, CA (US)

(72) Inventors: Ying Chen, San Diego, CA (US); Li Zhang, San Diego, CA (US); Jewon Kang, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 14/218,487

(22) Filed: Mar. 18, 2014

(65) Prior Publication Data

US 2014/0286423 A1    Sep. 25, 2014

Related U.S. Application Data

(60) Provisional application No. 61/803,429, filed on Mar. 19, 2013.

(51) Int. Cl.
| | |
|---|---|
| *H04N 19/51* | (2014.01) |
| *H04N 19/513* | (2014.01) |
| *H04N 19/597* | (2014.01) |
| *H04N 19/52* | (2014.01) |
| *H04N 19/80* | (2014.01) |

(52) U.S. Cl.
CPC ............ *H04N 19/513* (2014.11); *H04N 19/52* (2014.11); *H04N 19/597* (2014.11); *H04N 19/80* (2014.11)

(58) Field of Classification Search
None
See application file for complete search history.

(56) References Cited

U.S. PATENT DOCUMENTS

2015/0249838 A1\* 9/2015 Chang ................. H04N 19/597
375/240.16

OTHER PUBLICATIONS

Gopalakrishna, Srikanth, et al., CE2.h-related: Flexible Coding Order (FCO) and depth-first-based disparity, Input Document to Joint Collaborative Team on 3D Video Coding Extension Development, Doc. No. JCT3V-O0170 (Jan. 10, 2013).\*
Chen, et al., "Description of Core Experiment 2 (CE2): Disparity Vector Derivation," Apr. 20-26, 2013; Document of Joint Collaborative Team on 3D Video Coding Extension Development, Version 1, JCT3V-D1102, Apr. 26, 2013, 3 pp.
Lin, et al., "3D-CE2.a Results on Simplified Disparity Vector Derivation in Skip mode and Direct mode," Document of Joint Collaborative Team on 3D Video Coding Extension Development, JCT3V-E0164, Jul. 27-Aug. 2, 2013, 3 pp.
(Continued)

*Primary Examiner* — William C Vaughn, Jr.
*Assistant Examiner* — Lindsay Uhl
(74) *Attorney, Agent, or Firm* — Shumaker & Sieffert, P.A.

(57) ABSTRACT

A video decoder performs a neighboring-block based disparity vector (NBDV) derivation process to determine a disparity vector or performs a NBDV refinement (NBDV-R) process to determine the disparity vector. The video decoder uses the disparity vector as a disparity vector for a current block without using a median filtering process on multiple disparity motion vectors, wherein the current block is coded in either a skip mode or a direct mode. Furthermore, the video coder determines pixel values for the current block.

14 Claims, 9 Drawing Sheets

(56) References Cited

OTHER PUBLICATIONS

Lin, et al., "3D-CE2.a Results on Simplified Inter-view Candidate Derivation," Jan. 17-23, 2013, Document of Joint Collaborative Team on 3D Video Coding Extension Development, Version 2, JCT3V-C0133, Jan. 17, 2013, 4 pp.

Rusanovskyy, et al., "3D-AVC Test Model 6," Apr. 20-26, 2013; Document of Joint Collaborative Team on 3D Video Coding Extension Development, Version 1, JCT3V-D1003, 40 pp.

Response to Written Opinion dated Jun. 20, 2014, from International Application No. PCT/US2014/031162, filed on Jan. 13, 2015, 5 pp.

Second Written Opinion from International Application No. PCT/US2014/031162, dated Feb. 10, 2015, 8 pp.

Response to Second Written Opinion dated Feb. 10, 2015, from International Application No. PCT/US2014/031162, filed on Apr. 9, 2015, 17 pp.

Intenational Preliminary Report on Patentability from International Application No. PCT/US2014/031162, dated Jun. 17, 2015, 8 pp.

Zhao, et al., "CE7: MB-level NBDV for 3D-AVC," Joint Collaborative Team on 3D Video Coding Extensions of ITU-T SG 13 WP 3 and ISO/IEC JTC 1/SC 29/WG11, Jul. 27-Aug. 2, 2013; Document: JCT3V-E0136 Jul. 31, 2013, 10 pp.

Zhang, et al., "CE2.h related: Derived disparity vector for 3D-HEVC," Joint Collaborative Team on 3D Video Coding Extensions of ITU-T SG 13 WP 3 and ISO/IEC JTC 1/SC 29/WG11, Apr. 20-26, 2013, Document: JCT3V-D0194, Apr. 22, 2013, 3 pp.

Park, et al., "3D-CE2.h related: Simplification of disparity vector derivation," Joint Collaborative Team on 3D Video Coding Extensions of ITU-T SG 13 WP 3 and ISO/IEC JTC 1/SC 29/WG11, Apr. 20-26, 2013, Document: JCT3V-D0113, 4 pp.

Rusanovskyy, et al., "Common Test Conditions of 3DV Core Experiments," Joint Collaborative Team on 3D Video Coding Extensions of ITU-T SG 13 WP 3 and ISO/IEC JTC 1/SC 29/WG11, Jan. 17-23, 2013, Document: JCT3V-C1100, Jan. 22, 2013, 5 pp.

Lin, et al., "3D-CE3.h related: Unconstrained inside-view motion prediction in 3D video coding," Joint Collaborative Team on 3D Video Coding Extensions of ITU-T SG 13 WP 3 and ISO/IEC JTC 1/SC 29/WG11, Jan. 17-23, 2013; Document: JCT3V-C0136, Jan. 17, 2013, 3 pp.

Video and Requirements: "Applications and Requirements on 3D Video Coding", ISO/IEC JTC1/SC29/WG11 MPEG2011/N12035, Mar. 2011, URL, ftp://ftp.merl.com/pub/avetro/3dv-cfp/docs/w12035.zip, 7 pp.

Bang et al., "3D-CE2.A Results on Simplification on the Disparity Vector Derivation,"JCT3V-C0122, Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, 5 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chang, et al., "3D-CE5.h related: Depth-oriented Neighboring Block Disparity Vector (DoNBDV) with virtual depth", JCT-3V Meeting; MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16); URL: http://Phenix.Int-Evry.Fr/JCT2, No. JCT3V-B0090, 5 pp.

Chen, et al., "3D-CE2.a related: MB-level depth-to-DV conversion in ATM," JCT3V-C0134, Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, 3 pp.

U.S. Appl. No. 61/769,716, filed Feb. 26, 2013.
U.S. Appl. No. 61/770,263, filed Feb. 27, 2013.
U.S. Appl. No. 61/770,268, filed Feb. 27, 2013.
U.S. Appl. No. 61/772,321, filed Mar. 4, 2013.
U.S. Appl. No. 61/803,384, filed Mar. 19, 2013.
U.S. Appl. No. 61/815,656, filed Apr. 24, 2013.

Gopalakrishna, et al., "CE2.h-related: Flexible coding order (FCO) and depth-first-based disparity derivation," JCT-3V Meeting; MPEG Meeting; Jan. 17, 2013-Jan. 23, 2013; Geneva; (The Joint Collaborative Team on 3D Video Coding Extension Development of ISO/IECJTC1/SC29/WG11 and ITU-T SG.16); URL: http://phenix.int-evry.fr/jct2/,, No. JCT3V-C0170, XP030130586, 10 pp.

Hannuksela, et al., "3D-AVC Draft Text 5," JCT3V-C1002, Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, 82 pp.

Hannuksela, et al., "3D-AVC Draft Text 6", Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, 59 pp.

International Search Report and Written Opinion from International Application No. PCT/US2014/031162, dated Jun. 20, 2014, 13 pp.

ITU-T H.263, "Video Coding for Low Bit Rate Communication", Series H: Audiovisual and Multimedia Systems, Infrastructure of audiovisual services—Coding of moving video, Jan. 2005, 226 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

Kang, et al., "3D-CE2.h related: Enhanced disparity vector derivation", JCT-3V Meeting; MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16 ); URL: http://Phenix.Int-Evry.Fr/JCT2/,, No. JCT3V-C0050, 4 pp.

Kang, et al., "3D-CE5.h related: Improvements for disparity vector derivation", JCT-3V Meeting; MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16); URL: http://Phenix.Int-Evry.Fr/JCT2/,, No. JCT3V-B0047, 4 pp.

Lin, et al., "3D-CE2.a related: Simplified disparity vector derivation in Skip mode and Direct mode," Joint Collaborative Team on 3D Video Coding Extensions of ITU-T SG 16 WP 3 and ISO/IEC JTC 1/SC 29/WG 11, JCT3V-D0108, 4th Meeting: Incheon, KR, Apr. 20-26, 2013, 3 pp.

Lin, et al., "3D-CE2.A Results on Simplified Disparity Vector Derivation in Skip Mode and Direct Mode," Joint Collaborative Team on 3D Video Coding Extension Development of ITU-T SG 16 WP 3 and ISO/IEC JTC 1/SC 29/WG 11, 5th Meeting: Vienna, AT, Jul. 27-Aug. 2, 2013, 3 pp.

Lin, et al., "3D-CE5.a results on unification of the depth to DV conversion," JCT-3V Meeting; MPEG Meeting; Oct. 13, 2012-Oct. 19, 2012; Shanghai; (The Joint Collaborative Team on 3D Video

(56) References Cited

OTHER PUBLICATIONS

Coding Extension Development of ISO/IECJTC1/SC29/WG11 and ITU-T SG.16); URL: http://phenix.int-evry.fr/jct2/, No. JCT3V-B0081, 4 pp.

Rusanovskyy, et al., "Common Test Conditions of 3DV Core Experiments," Joint Collaborative Team on 3D Video Coding Extension Development of ITU-T SG 16 WP 3 and ISO/IEC JTC 1/SC 29/WG 11, JCT3V-D1100, 4th Meeting: Incheon, KR, Apr. 20-26, 2013, 5 pp.

Su, et al., "3DV-CE1.a: Block-based View Synthesis Prediction for 3DV-ATM", JCT2-A0107, MPEG Meeting; Jul. 16, 2012-Jul. 20, 2012; Stockholm; (Motion Picture Expert Group or ISO/IEC JTC1/SC29/WG11), No. m26069, XP030054484, 5 pp.

Sung, et al., "3D-CE5.h: Simplification of disparity vector derivation for HEVC-based 3D video coding", JCT-3V Meeting; MPEG Meeting; Jul. 16, 2012-Jul. 20, 2012; Stockholm; (The Joint Collaborative Team on 3D Video Coding Extension Development of ISO/IECJTC1/SC29/WG11 and ITU-T SG.16); URL: http://Phenix.Int-Evry.Fr/JCT2/, No. JCT3V-A0126, 4 pp.

Tech, et al., "3D-HEVC Test Model 2," JCT3V-B1005_d0, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, 126 pp.

Tian, et al.,"CE1.h: Backward View Synthesis Prediction using Neighbouring Blocks", JCT-3V Meeting; MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16 ); URL: http://Phenix.Int-Evry.Fr/JCT2/, No. JCT3V-C0152, XP030130568, 5 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Zhang, et al., "CE5.h: Disparity vector generation results", JCT2-A0097, JCT-3V Meeting; MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://Phenix.Int-Evry.Fr/JCT2/, XP030130096, 5 pp.

Zhao, et al., "CE7: MB-level NBDV for 3D-AVC," Joint Collaborative Team on 3D Video Coding Extensions of ITU-T SG 16 WP 3 and ISO/IEC JTC 1/SC 29/WG 11, 5th Meeting: Vienna, AT, Jul. 27-Aug. 2, 2013, 10 pp.

* cited by examiner

DISPARITY VECTOR DERIVATION IN 3D VIDEO CODING FOR SKIP AND DIRECT MODES

This application claims the benefit of U.S. Provisional Patent Application No. 61/803,429, filed Mar. 19, 2013, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

This disclosure is related to multi-view video coding and 3-dimensional (3D) video coding based on advanced codecs, including the coding of two or more views with the 3D-advanced video coding (AVC) codec. More specifically, techniques are related to disparity vector derivation for skip and direct modes. As described herein, a video decoder may perform a neighboring-block based disparity vector (NBDV) derivation process to determine a disparity vector or perform a NBDV refinement (NBDV-R) process to determine the disparity vector. When a current block is coded in skip mode or direct mode, the video decoder uses the disparity vector as a disparity vector for the current block without using a median filtering process on multiple disparity motion vectors. Furthermore, the video decoder determines pixel values for the current block.

In one example, this disclosure describes a method of decoding video data, the method comprising: performing an NBDV derivation process to determine a disparity vector or performing an NBDV-R process to determine the disparity vector; using the disparity vector as a disparity vector for a current block of the video data without using a median filtering process on multiple disparity motion vectors, wherein the current block is coded in either a skip mode or a direct mode; and determining pixel values for the current block.

In another example, this disclosure describes a method of encoding video data, the method comprising: performing an NBDV derivation process to determine a disparity vector or performing an NBDV-R process to determine the disparity vector; using the disparity vector as a disparity vector for a current block of the video data without using a median filtering process on multiple disparity motion vectors, wherein the current block is coded in either a skip mode or a direct mode; and entropy encoding syntax elements for a current slice that includes the current block.

In another example, this disclosure describes a device comprising: a memory storing decoded video blocks; and one or more processors configured to: perform a NBDV derivation process to determine a disparity vector or perform an NBDV-R process to determine the disparity vector; and use the disparity vector as a disparity vector for a current block of the video data without using a median filtering process on multiple disparity motion vectors, wherein the current block is coded in either a skip mode or a direct mode.

In another example, this disclosure describes a device comprising: means for performing an NBDV derivation process to determine a disparity vector or performing an NBDV-R process to determine the disparity vector; and means for using the disparity vector as a disparity vector for a current block of the video data without using a median filtering process on multiple disparity motion vectors, wherein the current block is coded in either a skip mode or a direct mode.

In another example, this disclosure describes a non-transitory computer-readable data storage medium having instructions stored thereon that when executed cause a video coding device to: perform an NBDV derivation process to determine a disparity vector or perform an NBDV-R process to determine the disparity vector; and use the disparity vector as a disparity vector for a current block of the video data without using a median filtering process on multiple disparity motion vectors, wherein the current block is coded in either a skip mode or a direct mode.

The details of one or more examples of the disclosure are set forth in the accompanying drawings and the description below. Other features, objects, and advantages will be apparent from the description, drawings, and claims.

DETAILED DESCRIPTION

Figure 1:
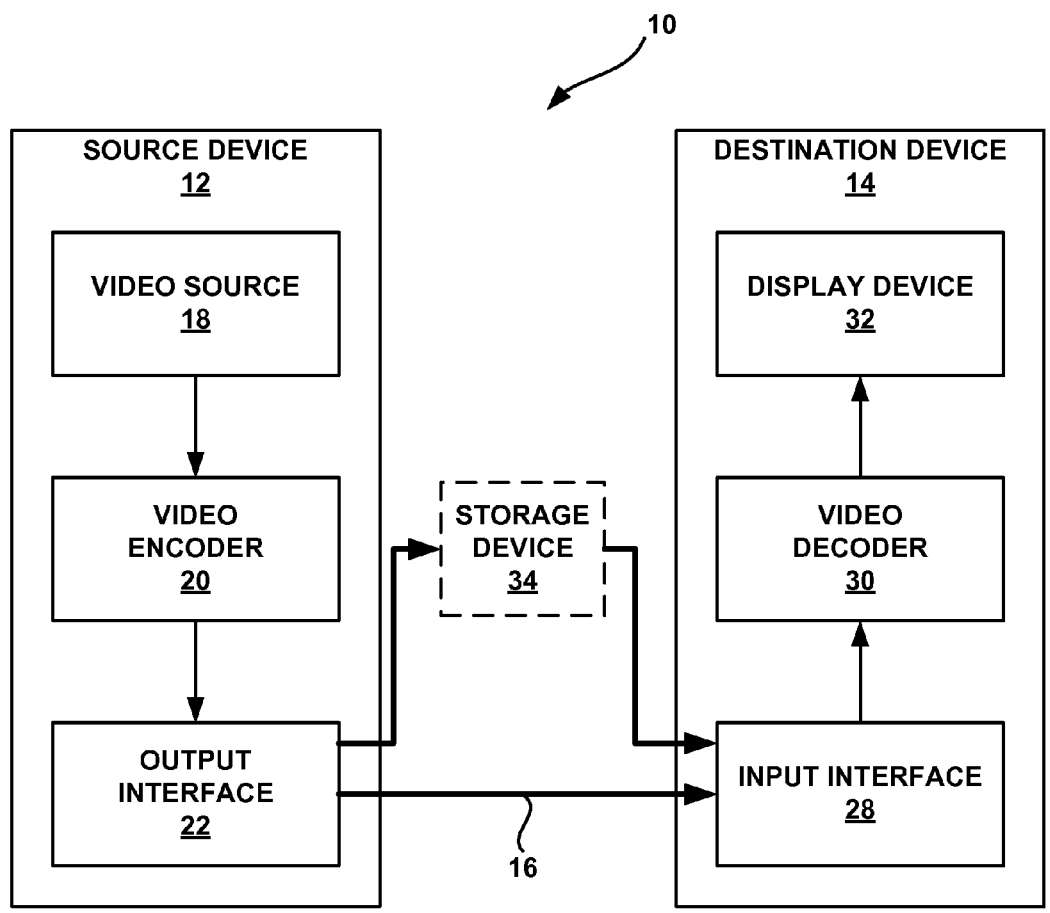
FIG. 1 is a block diagram illustrating an example video encoding and decoding system that may utilize the techniques described in this disclosure.

H.264/AVC is a video coding standard. In H.264/AVC, a video encoder may encode at least some video blocks of particular pictures using a skip mode or a direct mode (i.e., a skip/direct mode). When the video encoder encodes a video block using the skip mode, the video encoder does not signal motion information or residual data for the video block. When the video encoder encodes a video block using the direct mode, the video encoder does not signal motion information for the video block, but may signal residual data for the video block.

3D-AVC is an extension to the H.264/AVC standard for 3-dimensional (3D) video coding. In 3D-AVC, pictures may be associated with a plurality of views. Pictures of each view may correspond to the same scene from different camera positions. There may be considerable redundancy between pictures that are in the same time instance, but in different views. For instance, a motion vector of a block in a current picture may be similar to a motion vector of a corresponding block in an inter-view reference picture (i.e., a previously-coded picture that is in the same time instance as the current picture, but in a different view).

In 3D-AVC, a video coder may determine a disparity vector for a current block in a current picture and may then use the disparity vector for the current block to determine a corresponding block in an inter-view reference picture. In some versions of 3D-AVC, the video coder uses a neighboring blocks based disparity vector (NBDV) derivation process to determine a disparity vector for a current block. When the video coder performs the NBDV derivation process, the video coder may determine whether particular neighboring blocks have disparity motion vectors. If one of the neighboring blocks has a disparity motion vector, the video coder may convert the disparity motion vector of the neighboring block into the disparity vector for the current block.

However, if the current block is encoded using the skip mode or the direct mode and one of the neighboring blocks has a disparity motion vector, the video coder searches additional neighboring blocks for additional disparity motion vectors. If more than one of the neighboring blocks has a disparity motion vector, the video coder applies a median function (e.g., a median filtering process) to the disparity motion vectors. The video coder may use the resulting disparity motion vector as the disparity vector for the current block.

In some versions of 3D-AVC, the video coder may use a corresponding depth block or may use block-based view synthesis prediction (BVSP) to refine disparity vectors for blocks that are not encoded using the skip mode or the direct mode. However, the video coder does not use a corresponding depth block or BVSP to refine the disparity vector for a current block if the current block is encoded using the skip mode or the direct mode. The refinement of disparity vectors that were determined using the NBDV derivation process may be referred to herein as an NBDV refinement process or an NBDV-R process.

There may be several problems with the above-described process for determining disparity vectors. For example, the above-described process may result in inconsistent disparity vectors for the same block, depending on the mode with which the block is encoded. In another example, the above-described process may lead to unnecessary checks of spatial neighboring blocks. In another example, calculating the median function of multiple disparity motion vectors may bring only marginal coding efficiency benefits, but may increase complexity.

Techniques of this disclosure may address these and/or other problems. In one example, a video coder may perform a NBDV derivation process to determine a disparity vector or may perform an NBDV-R process to determine the disparity vector. Furthermore, the video coder may use the determined disparity vector as a disparity vector for a current block of the video data without using a median filtering process on multiple disparity motion vectors, wherein the current block is coded in either a skip mode or a direct mode. Implementation of such techniques may decrease the complexity of video encoders and/or video decoders.

FIG. 1 is a block diagram illustrating an example video encoding and decoding system 10 in accordance with one or more examples described in this disclosure. As shown in FIG. 1, video encoding and decoding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. As used herein, the term "video coder" refers generically to both video encoders and video decoders. In this disclosure, the terms "video coding" or "coding" may refer generically to video encoding or video decoding. Accordingly, source device 12 and destination device 14 may be examples of video coding devices or video coding apparatuses.

Source device 12 and destination device 14 are configured to implement multi-view coding (MVC). In MVC, source device 12 and destination device 14 each code pictures of different views. When the pictures of the different views are viewed together, the viewer perceives an image that encompasses a 3D volume, instead of an image that is constrained to the 2D area of the display.

As shown in FIG. 1, system 10 includes a source device 12 that generates encoded video data to be decoded at a later time by a destination device 14. Source device 12 and destination device 14 comprise any of a wide range of devices, including wireless handsets such as so-called "smart" phones, so-called "smart" pads, or other such wireless devices equipped for wireless communication. Additional examples of source device 12 and destination device 14 include, but are not limited to, digital televisions, devices in digital direct broadcast systems, devices in wireless broadcast systems, personal digital assistants (PDAs), laptop computers, desktop computers, tablet computers, e-book readers, digital cameras, digital recording devices, digital media players, video gaming devices, video game consoles, cellular radio telephones, satellite radio telephones, video teleconferencing devices, video streaming devices, and the like.

Destination device 14 may receive the encoded video data that is to be decoded via a link 16. Link 16 may comprise any type of medium or device capable of moving the encoded video data from source device 12 to destination device 14. In one example, link 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, output interface 22 outputs encoded data to a storage device 34. Similarly, input interface 28 accesses encoded data from storage device 34. Examples of storage device 34 include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 comprises a file server or another intermediate storage device that stores the encoded video generated by source device 12. In these examples, destination device 14 accesses stored video data from storage device 34, e.g., via streaming or download. The file server may be any type of server capable of storing encoded video data and transmitting that encoded video data to the destination device 14. Example file servers include web servers (e.g., for serving websites), file transfer protocol (FTP) servers, network attached storage (NAS) devices, local disk drives, or other devices or systems for providing files. Destination device 14 may access the encoded video data through any standard data connection, including an Internet connection. Standard data connections may include wireless channels (e.g., Wi-Fi connections), wired connections (e.g., DSL, cable modem, etc.), or combinations of both that are suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions (e.g., via the Internet), encoding of digital video for storage on a data storage medium, decoding of digital video stored on a data storage medium, or other applications. In some examples, system 10 is configured to support one-way or two-way video transmission to support applications such as video streaming, video playback, video broadcasting, and/or video telephony.

In the example of FIG. 1, source device 12 includes a video source 18, a video encoder 20 and an output interface 22. In some examples, output interface 22 includes a modulator/demodulator (modem) and/or a transmitter. Video source 18 includes one or more of a video capture device (e.g., a video camera), a video archive containing previously captured video, a video feed interface to receive video from a video content provider, and/or a computer graphics system for generating computer graphics data as the source video, a combination of such sources, or any other source of video data. In one example where video source 18 is a video camera, source device 12 and destination device 14 are so-called camera phones or video phones. However, the techniques described in this disclosure are applicable to video coding in general, and may be applied to wireless and/or wired applications.

Video encoder 20 encodes the captured, pre-captured, or computer-generated video. Output interface 22 of source device 12 is configured to transmit the encoded video data to destination device 14. The encoded video data may also (or alternatively) be stored onto storage device 34 for later access by destination device 14 or other devices, for decoding and/or playback.

In the example of FIG. 1, destination device 14 includes an input interface 28, a video decoder 30, and a display device 32. In some cases, input interface 28 includes a receiver and/or a modem. Input interface 28 of destination device 14 receives the encoded video data over link 16 or from storage device 34. The encoded video data communicated over link 16, or provided on storage device 34, includes a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or may be external to, destination device 14. In some examples, destination device 14 includes an integrated display device and is also configured to interface with an external display device. In other examples, destination device 14 is a display device. In general, display device 32 displays the decoded video data to a user, and comprises any of a variety of display devices such as a liquid crystal display (LCD), a plasma display, an organic light emitting diode (OLED) display, or another type of display device.

Although not shown in FIG. 1, in some examples, video encoder 20 and video decoder 30 are each integrated with an audio encoder and decoder, and include appropriate MUX-DEMUX units, or other hardware and software, to handle encoding of both audio and video in a common data stream or separate data streams. If applicable, in some examples, MUX-DEMUX units conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. Video encoder 20 is configured to encode video data and video decoder 30 is configured to decode video data in accordance with techniques described in this disclosure.

Video encoder 20 and video decoder 30 may operate according to various video coding standards. For instance, video encoder 20 and video decoder 30 may operate according to video coding standards such as ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC), Multiview Video Coding (MVC), and multi-view plus depth (MVC+D) extensions. H.264/AVC is described in "Advanced video coding for generic audiovisual services," ITU-T Recommendation H.264, June 2011 (hereinafter, "the H.264/AVC standard"). A joint draft of MVC is described in "Advanced video coding for generic audiovisual services," ITU-T Recommendation H.264, March 2010.

Currently, a Joint Collaboration Team on 3D Video Coding (JCT-3V) of VCEG and MPEG is developing a 3D video (3DV) standard based on H.264/AVC, i.e., 3D-AVC. 3D-AVC includes and supports new coding tools in addition to the inter-view prediction in supported by MVC. Software for 3D-AVC (i.e., 3D-ATM) can be downloaded from http://mpeg3dv.research.nokia.com/svn/mpeg3dv/tags/3DV-ATMv6.2/. Hannuksela et al., "3D-AVC draft text 5," Joint Collaborative Team on 3D Video Coding Extension Development of ITU-T SG 16 WP 3 and ISO/IEC JTC 1/SC 29/WG 11, 3$^{rd}$ Meeting, Geneva, CH, 17-23 Jan. 2013, document JCT3V-C1002, hereinafter, "JCT3V-C1002" is a draft text of 3D-AVC. As of Feb. 28, 2014, JCT3V-C1002 is available from http://phenix.it-sudparis.eu/jct2/doc_end_user/documents/3_Geneva/wg11/JCT3V-C1002-v3.zip.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG), or extensions thereof. Currently, a Joint Collaboration Team on 3D Video Coding (JCT-3C) of VCEG and MPEG is developing a 3DV standard based on HEVC, for which part of the standardization efforts includes the standardization of a multi-view video codec based on HEVC (MV-HEVC) and another part includes the standardization of 3D video coding based on HEVC (3D-HEVC).

For purposes of description, video encoder 20 and video decoder 30 are described in the context of the H.264/AVC standard and extensions thereof, such as the 3D-AVC standard. However, the techniques of this disclosure are not limited to any particular coding standard. For example, the techniques described in this disclosure may be implemented by video encoders/decoders (codecs) for multi-view coding (i.e., coding of two or more views). Other examples of video compression standards include MPEG-2 and ITU-T H.263, and include 3D-HEVC. Proprietary coding techniques, such as those referred to as On2 VP6/VP7/VP8, may also implement one or more of the techniques described herein.

Video encoder 20 may generate and output a bitstream. As defined in the H.264/AVC standard, the bitstream may comprise a sequence of bits that forms a representation of coded pictures and associated data forming one or more coded video sequences. A coded picture is a coded representation of a picture. In H.264/AVC, a video sequence typically includes a series of video pictures from a view. A group of pictures (GOP) generally comprises a series of one or more video pictures. A GOP may include syntax data in a header of the GOP, a header of one or more pictures of the GOP, or elsewhere, that describes a number of pictures included in the GOP. Each coded picture may include picture syntax data that describes an encoding mode for the respective picture. Video encoder 20 typically operates on video blocks within individual video pictures in order to encode the video data.

In H.264/AVC, a video block may correspond to a macroblock, a partition of a macroblock, and possibly a sub-block of a partition, as defined in the H.264/AVC standard. The video blocks may have fixed or varying sizes, and may differ in size according to a specified coding standard. In some instances, this disclosure may refer to a video block as simply a "block." Each video picture may include a plurality of slices (i.e., "video slices"). Each slice may include a plurality of blocks.

H.264/AVC supports intra prediction and inter prediction for video blocks. When a video coder uses intra prediction or inter prediction to code a video block, the video coder may generate a predictive block for the video block. The predictive block comprises a block of pixel values (i.e., samples). When a video block is intra-mode encoded (i.e., intra predicted), the video encoder may generate the predictive block for the video block based on pixel values of other blocks in the same picture as the video block. In at least some examples of this disclosure, the phrase "based on" may be interpreted as "based at least in part on." Furthermore, when a video block is intra predicted, the video coder may generate data describing an intra-prediction mode for the video block.

When a video block is inter-mode encoded (i.e., inter-predicted), the video coder may generate the predictive block for the video block based on pixel values of blocks in one or more pictures other than the picture containing the video block. Furthermore, when a video block is inter-predicted, a video coder may determine one or more motion vectors for the video block. For instance, the video block may include information defining a motion vector for the video block. The motion vector for a video block may refer to a location in a reference picture in the same view as the video block or may refer to a location in a reference picture in another view. In some examples, the data defining the motion vector for a block describes a horizontal component of the motion vector, a vertical component of the motion vector, and a resolution for the motion vector (e.g., one-quarter pixel precision or one-eighth pixel precision). In addition, when a video block is inter-predicted, the video block may include reference index information, such as data identifying a reference picture to which the motion vector points, and/or a reference picture list (e.g., RefPicList0 or RefPicList1) to which the motion vector applies.

H.264/AVC supports intra prediction for block sizes of 16×16, 8×8, or 4×4 for luma components, and 8×8 for chroma components. H.264/AVC supports inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of a block in terms of vertical and horizontal dimensions (e.g., 16×16 pixels or 16 by 16 pixels). In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

An inter macroblock (MB) is a macroblock coded using inter prediction. In H.264/AVC, each inter MB may be partitioned into four different ways.

One 16×16 MB partition,
Two 16×8 MB partitions,
Two 8×16 MB partitions, and
Four 8×8 MB partitions.

Different MB partitions in one MB may have different reference index values for each direction (i.e., RefPicList0 or RefPicList1). In general, a reference index value indicates a reference picture in a reference picture list. Thus, a video coder may generate, based on different reference pictures, predictive blocks for different MB partitions of one inter MB. When an MB is not partitioned into four 8×8 MB partitions, the MB may have only one motion vector for the whole MB partition in each direction.

When an MB is partitioned into four 8×8 MB partitions, each 8×8 MB partition can be further partitioned into sub-blocks. There are four different ways to partition a 8×8 MB partition into sub-blocks:

One 8×8 sub-block,
Two 8×4 sub-blocks,
Two 4×8 sub-blocks, and
Four 4×4 sub-blocks.

Each sub-block can have a different motion vector in each direction. A B slice is a slice in which video blocks are allowed to be encoded using bi-directional inter prediction. A video block encoded using bi-directional inter-prediction has two motion vectors that refer to reference pictures in two different reference picture lists. In other words, each sub-block in a B slice may have a RefPicList0 motion vector and a RefPicList1 motion vector. A "sub-block partition" is a term used to indicate how an 8×8 MB partition is partitioned into sub-blocks. In other words, an 8×8 MB partition is partitioned into sub-blocks that are named as sub-block partitions.

In H.264/AVC, following intra-predictive or inter-predictive coding of a macroblock of a picture, video encoder 20 may calculate residual data for the macroblock. The residual data may correspond to pixel differences between pixels of the unencoded picture and corresponding prediction values for the macroblock. Following application of any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, video encoder 20 may round an n-bit value down to an m-bit value during quantization, where n is greater than m.

In some examples, video encoder 20 utilizes a predefined scan order to scan the quantized transform coefficients to produce a serialized vector that can be entropy encoded. In other examples, video encoder 20 performs an adaptive scan. In some examples, after video encoder 20 scans the quantized transform coefficients to form a one-dimensional vector, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data. Video encoder 20 may include the entropy-encoded syntax elements, and other syntax elements in a bitstream.

Video decoder 30 may implement the inverse of the techniques of video encoder 20. For example, video decoder 30 may decode the encoded video bitstream and may determine the residual blocks by inverse quantization and inverse transform. Video decoder 30 may sum the residual blocks with blocks of previously decoded pictures to determine the pixel values for the blocks within the picture.

Video encoder 20 and video decoder 30 may be configured to implement the techniques described in this disclosure. For example, video encoder 20 and video decoder 30 may be configured to derive a disparity vector utilizing the techniques described in this disclosure. The term "video coder" may refer to video encoder 20 or video decoder 30, and the term "coding" may refer to encoding or decoding. In some examples, video decoder 30 may be configured to implement the techniques described in this disclosure, and video encoder 20 may not, or vice-versa.

As indicated above, MVC is an extension of H.264/AVC. In MVC, there may be multiple views of the same scene from different viewpoints. In the context of multi-view coding, the term "access unit" may refer to a set of pictures that correspond to the same time instance. Thus, video data may be conceptualized as a series of access units occurring over time.

In multi-view coding, a bitstream may have a plurality of layers. Each of the layers may correspond to a different view. In multi-view coding, a view may be referred to as a "base view" if a video decoder (e.g., video decoder 30) can decode pictures in the view without reference to pictures in any other view. A view may be referred to as a "non-base view" or a "dependent view" if decoding of pictures in the view is dependent on decoding of pictures in one or more other views.

MVC supports inter-view prediction as well as temporal inter prediction. In inter-view prediction, a video coder determines, based on samples of an inter-view reference picture, a predictive block for a current video block. An inter-view reference picture is a reference picture that is in the same time instance as a picture that a video coder is currently coding (i.e., a current picture), but is in a different view than the current picture. Thus, in MVC, inter-view prediction is performed among pictures captured in the different views of the same access unit (i.e., with the same time instance) to remove correlation between views. In temporal inter prediction, a video coder determines, based on samples of a temporal reference picture, a predictive block for a current video block. A temporal reference picture is a reference picture that is in the same view as a block that a video coder is currently coding (i.e., a current picture), but is in a different time instance than the current picture.

In the context of multi-view video coding, there are two kinds of motion vectors. One kind of motion vector is a normal (i.e., temporal) motion vector pointing to temporal reference pictures and the corresponding temporal inter prediction is motion-compensated prediction (MCP). The other kind of motion vector is a disparity motion vector pointing to pictures in a different view (i.e., inter-view reference pictures) and the corresponding inter prediction is disparity-compensated prediction (DCP). A picture coded with inter-view prediction may be added into a reference picture list for the inter-view prediction of the other non-base views. An inter-view prediction reference picture can be put in any position of a reference picture list in the same way with an inter prediction reference picture.

Figure 2:
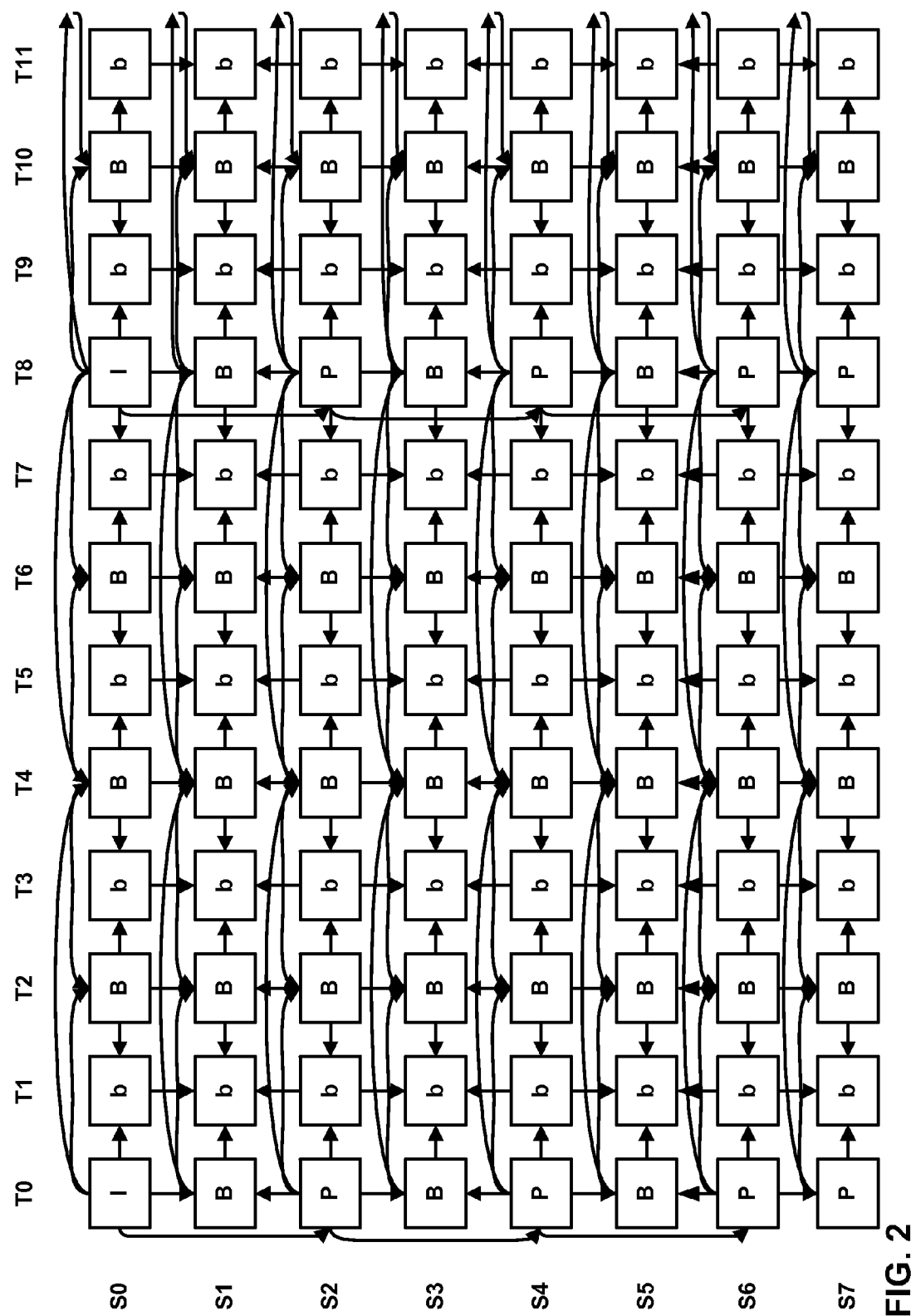
FIG. 2 is a conceptual diagram illustrating an example multi-view video coding temporal and inter-view prediction structure.

FIG. 2 is a conceptual diagram illustrating an example multi-view video coding temporal and inter-view prediction structure. In other words, a typical MVC prediction (including both inter-picture prediction within each view and inter-view prediction) structure for multi-view video coding is shown in FIG. 2. In the example of FIG. 2, predictions are indicated by arrows, the pointed-to object using the pointed-from object for prediction reference.

In the example of FIG. 2, each square corresponds to a view component. In the example of FIG. 2, access units are labeled T0 . . . T11 and views are labeled S0 . . . S7. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 2, view components in different views of the same access unit may be available as reference pictures. The use of one view component of an access unit as a reference picture for another view component of the same access unit may be referred to as inter-view prediction.

In the context of multi-view and 3D video coding, a "view component" may be a coded representation of a view in a single access unit. When a view includes both coded texture and depth representations, a view component consists of a texture view component and a depth view component. A view component may comprise a texture view component and a depth view component. Thus, each texture view component may have a corresponding depth view component. In general, the texture view components include video content (e.g., luma and chroma components of pixel values), and the depth view components may indicate relative depths of the pixels within the texture view components. Thus, the plurality of video pictures for each view may be referred to as texture view components. In this disclosure, a "view" may refer to a sequence of view components associated with the same view identifier.

More specifically, a texture view component (i.e., a texture picture) may be a coded representation of the texture of a view in a single access unit. The texture view component includes the actual image content that is displayed. For example, the texture view component may include luma (Y) and chroma (Cb and Cr) components. A texture view may be a sequence of texture view components associated with an identical value of view order index. A view order index of a view may indicate a camera position of the view relative to other views.

The techniques of this disclosure relate to coding 3D video data by coding texture and depth data. In general, the term "texture" is used to describe luminance (that is, brightness or "luma") values of an image and chrominance (that is, color or "chroma") values of the image. In some examples, a texture image may include one set of luminance data and two sets of chrominance data for blue hues (Cb) and red hues (Cr). In certain chroma sampling formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

A depth view component (i.e., a depth picture) may be a coded representation of the depth of a view in a single access unit. A depth view may be a sequence of depth view components associated with an identical value of view order index. The depth view component may indicate relative depths of the pixels in its corresponding texture view component. As one example, a depth view component is a gray scale image that includes only luma values. In other words, the depth view component may not convey any image content, but rather may provide a measure of the relative depths of the pixels in the texture view component.

In some examples, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a dark gray pixel in the depth view component may indicate that its corresponding pixel or pixels in the texture view component is further away than a light gray pixel in the depth view component. Because only gray scale is needed to identify the depth of pixels, the depth view component need not include chroma components, as color values for the depth view component may not serve any purpose. The depth view component using only luma values (e.g., intensity values) to identify depth is provided for illustration purposes and should not be considered limiting. In other examples, other techniques may be utilized to indicate relative depths of the pixels in texture view components.

Depth data generally describes depth values for corresponding texture data. For example, a depth image may include a set of depth pixels that each describes depth for corresponding texture data. A video coder may use the depth data to determine horizontal disparity for the corresponding texture data. Thus, a device that receives the texture and depth data may display a first texture image for one view (e.g., a left eye view) and may use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in a second view, where the two pixels correspond to the same portion of the same object as represented in the two views.

In other examples, depth data may be defined for pixels in a z-dimension perpendicular to the image plane, such that a depth associated with a given pixel is defined relative to a zero disparity plane defined for the image. Such depth may be used to create horizontal disparity for displaying the given pixel, such that the given pixel is displayed differently for the left and right eyes, depending on the z-dimension depth value of the given pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to present a slight perception of depth, or may be displayed in different locations for the left and right eye (e.g., with horizontal disparity that is opposite that of pixels located in front of the zero disparity plane). Many other techniques may also be used to convey or define depth data for an image.

For each pixel in the depth view component, there may be one or more corresponding pixels in the texture view component. For instance, if the spatial resolutions of a depth view component and a texture view component are the same, each pixel in the depth view component corresponds to one pixel in the texture view component. If the spatial resolution of a depth view component is less than that of a texture view component, then each pixel in the depth view component corresponds to multiple pixels in the texture view component. The value of the pixel in the depth view component may indicate the relative depth of the corresponding one or more pixels in the texture view.

In some examples, video encoder 20 signals video data for the texture view components and the corresponding depth view components for each of the views. Video decoder 30 may utilize both the video data of texture view components and the depth view components to decode the video content of the views for display. A display (e.g., display device 32) then displays the multi-view video to produce 3D video.

3D-AVC is compatible to H.264/AVC in a way that a texture part of a base view is fully decodable for an H.264/AVC decoder. For enhanced view components in 3D-AVC, a video coder (e.g., video encoder 20 or video decoder 30) may code (e.g., encode or decode) depth view components prior to corresponding texture view components. Furthermore, the video coder may code a texture view component based on the information from the depth view component. Thus, 3D-AVC may use a coding order known as a depth-first coding. In contrast, a video coder may code each texture view component before the respective depth view components in texture-first coding order.

In one example, the coding orders of the texture and depth view components in 3D-AVC may be exemplified as follows. In this example, T0 and D0 refer to the texture and depth view components of the base view, respectively. Furthermore, in this example, Ti and Di refer to the texture and depth view components of the i-th dependent view, respectively. In this example, the video coder uses three views:

T0, D0, D1, D2, T1, T2: The base views (T0 and D0) are coded with the texture-first coding order while the dependent view is coded with the depth-first coding order. The hybrid coding order is currently used in common test conditions of 3D-AVC.

T0, D0, T1, D1, T2, D2: All the view components are coded with the texture-first coding order.

If inter-view prediction is enabled for Ti, the reference texture view is defined as the view that includes the inter-view reference picture and the corresponding depth view is defined as the reference depth view that has the same view order index as that of the reference texture view.

In 3D-AVC, a video coder may perform depth-based motion vector prediction (D-MVP) for normal inter prediction modes. Motion vector prediction may comprise prediction of a motion vector for a video block. In this disclosure, the term "normal" inter prediction modes may refer to inter prediction modes other than the skip mode or the direct mode. D-MVP refers to a motion vector prediction method that uses the associated depth map data of the current view. The associated depth map data for the current view is available in 3D-AVC due to the depth-first coding order used in 3D-AVC. A video coder may apply D-MVP with the texture view components in the dependent views.

In 3D-AVC, motion vector prediction uses neighboring blocks. The neighboring blocks include, in the following order, a left block, an above block, an above-right block, and an above-left block of the current block. The video coder may only use the motion vector in the above-left block only when one of the other three neighboring blocks (i.e., the left block, the above block, and the above-right block) does not contain a motion vector and is thus considered to be unavailable.

The motion vector from a neighboring block is considered as unavailable if the motion vector has a different type from the current motion vector to be predicted. For instance, the motion vector from a neighboring block is considered to be unavailable if the motion vector from the neighboring block is a disparity motion vector while the motion vector to be predicted is a temporal motion vector, or vice versa. The type of a motion vector depends on the corresponding reference index. That is, if the reference index corresponds to an inter-view reference picture, the motion vector is a disparity motion vector and the type is "disparity" and if the reference index corresponds to a temporal reference picture (i.e., a reference picture in the same view as the current picture), the motion vector is a temporal motion vector and the type is "temporal."

In 3D-AVC, if three of the neighboring blocks are available, the video coder may employ the motion vectors in the three neighboring blocks for the motion vector prediction of the current block. In temporal inter prediction, if the motion vectors of the three neighboring blocks all have the same type and all have the same reference indices, the video coder may use the median filter directly, as described in section 8.4.1.3.1 of H.264/AVC. Section 8.4.1.3.1 of H.264/AVC is reproduced below.

8.4.1.3.1 Derivation Process for Median Luma Motion Vector Prediction

Inputs to this process are:

the neighbouring partitions mbAddrN\mbPartIdxN\subMbPartIdxN (with N being replaced by A, B, or C), the motion vectors mvLXN (with N being replaced by A, B, or C) of the neighbouring partitions, the reference indices refIdxLXN (with N being replaced by A, B, or C) of the neighbouring partitions, the reference index refIdxLX of the current partition.

Output of this process is the motion vector prediction mvpLX.

The variable mvpLX is derived as specified by the following ordered steps:

1. When both partitions mbAddrB\mbPartIdxB\subMbPartIdxB and mbAddrC\mbPartIdxC\subMbPartIdxC are not available and mbAddrA\mbPartIdxA\subMbPartIdxA is available, mvLXB=mvLXA (8-207)

mvLXC=mvLXA (8-208)

refIdxLXB=refIdxLXA (8-209)
refIdxLXC=refIdxLXA (8-210)

2. Depending on reference indices refIdxLXA, refIdxLXB, or refIdxLXC, the following applies:

If one and only one of the reference indices refIdxLXA, refIdxLXB, or refIdxLXC is equal to the reference index refIdxLX of the current partition, the following applies. Let refIdxLXN be the reference index that is equal to refIdxLX, the motion vector mvLXN is assigned to the motion vector prediction mvpLX:
mvpLX=mvLXN (8-211)

Otherwise, each component of the motion vector prediction mvpLX is given by the median of the corresponding vector components of the motion vector mvLXA, mvLXB, and mvLXC:
mvpLX[0]=Median(mvLXA[0], mvLXB[0], mvLXC[0]) (8-212)
mvpLX[1]=Median(mvLXA[1], mvLXB[1], mvLXC[1]) (8-213)

Otherwise (if the motion vectors of the three neighboring blocks belong to different types and have different reference indices), the video coder may further derive a motion vector. The motion vector may be used for determining a motion vector predictor. When the current reference picture is an inter-view reference picture, the video coder checks the motion vector types and their reference indices in neighboring block positions. If the motion vectors have all the same type and the same reference indices, the video coder applies the median filter. If less than three neighboring blocks are available, the video coder further derives motion vectors for the unavailable blocks so that three neighboring blocks become available (i.e., so that the video coder identifies three neighboring blocks having available disparity motion vectors).

For example, if a spatial neighboring block does not contain an available temporal motion vector, the video coder may predict a temporal motion vector for the current block. The video coder may identify a reference block of the current block in the reference view picture by the disparity vector derived as described in the portion of this disclosure related to block-based view synthesis prediction in 3D-AVC. If the motion vector of a block containing the center position of the reference block is a temporal motion vector, the video coder derives the motion vector of the block containing the center position of the reference block for the current spatial neighboring block. If the temporal motion vector is considered to be unavailable (e.g., the reference block is an intra block or the temporal motion vector does not point to a reference picture in the reference view aligned with the current reference picture), the video coder sets the derived motion vector to zero.

If a spatial neighboring block does not contain an available disparity motion vector and a disparity motion vector is to be predicted for the current block, the video coder may convert the disparity vector derived for the current block to a disparity motion vector as described in the portion of this disclosure related to block-based view synthesis prediction in 3D-AVC.

In 3D-AVC, the D-MVP method is incorporated into the conventional median function-based motion vector prediction in H.264/AVC. Consequently, when the motion vectors in spatial neighboring blocks are available (or not available originally, but made available with the methods mentioned above), the video coder may still apply the median function to three motion vectors. However, all of the three motion vectors should belong to the same type.

In many instances, a motion vector of a block that a video coder is currently coding (i.e., a current block) is similar to a motion vector of a corresponding block in an inter-view reference picture. Hence, in some examples, the video coder may use the motion vector of the corresponding block as a predictor of the motion vector of the current block. The term "inter-view motion prediction" may refer to the use of motion information (e.g., a motion vector) of a corresponding block in an inter-view reference picture as a predictor of motion information of a block that the video coder is currently coding.

Similarly, the residual data of a block that the video coder is currently coding may be similar to residual data of a corresponding block in an inter-view reference picture. Hence, in some examples, the video coder may use the residual data of the corresponding block as a predictor of the residual data of the current block. The term "inter-view residual prediction" may refer to the use of residual data of a corresponding block in an inter-view reference picture as a predictor of the residual data of a block that the video coder is currently coding.

In 3D-AVC, a video coder may perform inter-view motion prediction for blocks coded using skip and direct modes. When a video block, such as an MB or MB partition is coded in skip mode, no motion data or residual data is signaled for the video block. For instance, in H.264/AVC, a skipped MB is an MB for which no data is coded other than an indication that the MB is to be decoded as "skipped." When a video block is coded using direct mode, no motion vector is coded for the video block. For instance, in H.264/AVC, direct prediction is an inter prediction for a block (i.e., an M×N array of samples) for which no motion vector is decoded. When a video block is coded using direct mode, residual data may be signaled for the video block. In other words, when a video block is coded using direct mode, a video encoder may include, in a bitstream, data (e.g., syntax elements) from which a video decoder may determine residual data for the block, but not data (e.g., syntax elements) from which the video decoder may determine motion information for the block. Similarly, when a video block is coded using direct mode, a video decoder may obtain, from a bitstream, data (e.g., syntax elements) from which the video decoder may determine residual data for the block, but does not obtain, from the bitstream, data from which the video decoder determines motion information for the block.

As described in sections 7.3.5 and 7.4.5 of the H.264/AVC standard, a macroblock_layer syntax structure for a macroblock may include an mb_type syntax element that specifies a macroblock type for the macroblock. The semantics of the mb_type syntax element depend on the slice type of the slice containing the macroblock. If the slice is a P slice, the macroblock types include a P_Skip type. When the macroblock type of a macroblock is P_Skip, no further data is present for the macroblock in the bitstream. If the slice is a B slice, the macroblock types include a B_Skip mode and a B_Direct_16×16 mode (i.e., a B-16×16 direct mode). When the macroblock type of a macroblock is B_Skip, no further data is present for the macroblock in the bitstream. When the macroblock type of a macroblock is B_Direct_16×16, no motion vector differences or reference indices are present for the macroblock in the bitstream. Furthermore, when the macroblock type of a macroblock is B_Direct_16×16, the functions MbPartWidth(B_Direct_16×16) and MbPartHeight(B_Direct_16×16) are used in the derivation process for motion vectors and reference frame indices in subclause 8.4.1 of the H.264/AVC specification for direct mode prediction.

Furthermore, a macroblock_layer syntax structure may include one or more sub_mb_pred syntax structures. A sub_mb_pred syntax structure may include four sub_mb_type syntax elements that specify sub-macroblock types. The sub-macroblock types include a B_Direct_8×8 mode (i.e., a B-8×8 direct mode). When the sub-macroblock type of a sub-macroblock is B_Direct_8×8, no motion vector differences or reference indices are present for the sub-macroblock in the bitstream. The functions SubMbPartWidth(B_Direct_8×8) and SubMbPartHeight(B_Direct_8×8) are used in the derivation process for motion vectors and reference frame indices in subclause 8.4.1 of the H.264/AVC standard for direct mode prediction.

Particularly, in 3D-AVC, the video coder may perform the inter-view motion prediction in P_skip, B_skip, B_Direct_16×16, and B_8×8_Direct modes. In these modes, the video coder may use a disparity vector to identify a reference block either from the neighboring blocks or from the derived disparity vector from the corresponding depth block associated with the current MB. Disparity vector derivation via a depth map is detailed elsewhere in this disclosure.

Figure 3:
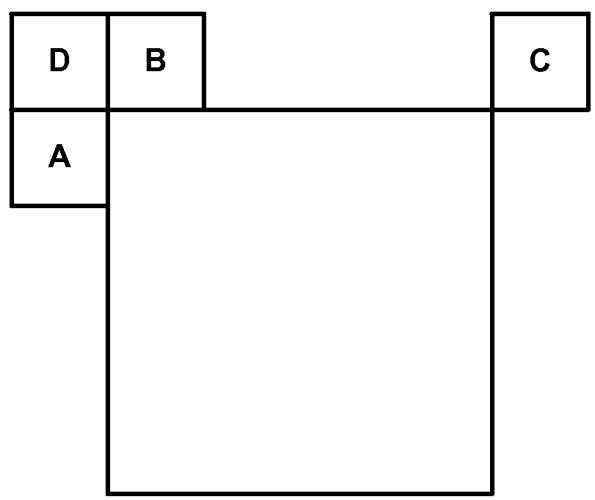
FIG. 3 is a conceptual diagram illustrating examples of spatial neighbors relative to a current macroblock.

FIG. 3 is a conceptual diagram illustrating examples of spatial neighbors relative to a current macroblock. The video coder checks three spatial neighboring blocks for its availability (i.e., whether the spatial neighboring block has a disparity motion vector or not). The three spatial neighboring blocks are defined as: left 4×4 block (A), above 4×4 block (B), above-right 4×4 block (C). In some examples, when C is unavailable, C is replaced by the above-left 4×4 block (D), which are depicted in FIG. 3. If only one spatial neighboring block is available (i.e., the spatial neighboring block contains a disparity motion vector), this disparity motion vector becomes the disparity vector. Otherwise, (i.e., none of the spatial neighboring blocks contain a disparity motion vector or at least two of the spatial neighboring blocks contain disparity motion vectors), the video coder uses a disparity vector derived from the depth block associated with the current MB as the disparity motion vector for the block which does not contain a disparity motion vector. Block-based view synthesis in 3D-AVC is detailed elsewhere in this disclosure. Afterwards, the video coder applies a median filter to get the disparity vector.

The video coder may use the disparity vector determined from the above process to determine a reference block in a reference view picture. Within the reference block, the motion vector (namely inter-view motion vector) if available, is set equal to the motion vector of the current block and the reference index of the current block is derived accordingly.

If the inter-view motion vector is not available (i.e., the reference block in the base view pointed to by the disparity vector is intra-coded), the video coder uses a conventional median-based motion vector prediction scheme. In this case, the video coder first derives a reference index and the video coder uses the D-MVP scheme described in the portion of the disclosure related to depth-based motion vector prediction (D-MVP) in 3D-AVC for normal inter modes to derive the motion vector prediction for the current MB.

In 3D-AVC, a video coder may perform disparity vector derivation via a depth map. That is, how the video coder derives the disparity vector may vary with each low-level coding tool, but, commonly, the video coder employs the depth data of the dependent views for the texture view component coding owing to the depth-first coding order. An in-loop block-based view synthesis inter-view prediction (BVSP) and depth-based motion vector prediction (D-MVP) in 3D-AVC are the low-level coding tools, mainly, using the disparity vector converted from the depth values of the depth map in the dependent frame. In 3D-AVC, the video coder stores the results of the conversion process from the actual depth map value to a disparity to a particular view in look-up tables with camera parameters.

In at least some versions of 3D-AVC, the video coder may perform a disparity vector derivation using a maximum depth from four corners of a corresponding depth block. For instance, to derive the depth value, the video coder first identifies the reference depth block of a depth view component. The reference depth block is co-located/corresponding to the current MB/partition/sub-block. The video coder accesses the four corners of the identified reference depth block. The corner samples correspond to the top-left, top-right, bottom-left and bottom-right depth samples. The video coder then calculates a depth value by taking the maximum of the four corner depth samples. Finally, the video coder may infer the horizontal component of a disparity vector from the look-up table using the calculated depth value and the vertical component of the disparity vector is set to 0.

In this method, the number of accessed depth samples increases when the MB is divided into partitions or sub-blocks. For example, when a 16×16 MB is partitioned into four 8×8 partitions, the number of depth samples to be accessed is 16. When a 16×16 MB is partitioned into sixteen 4×4 partitions, the number of the depth samples to be accessed is 64.

In some versions of 3D-AVC, a video coder may derive a disparity vector using a neighboring block based disparity vector derivation (NBDV) derivation process. In at least some examples where a video coder uses an NBDV derivation process, the video coder may perform texture-first coding. For instance, the video coder may code a texture component of a view component first in 3D-AVC. As part of the coding, the video coder may determine a disparity vector for a block in the texture component without coding a depth component of the view component.

As described in other examples of this disclosure, a video coder may use a disparity vector as an estimator of the disparity between two views. Because neighboring blocks share almost the same motion/disparity information in video coding, the video coder can use the motion vector information in blocks that neighbor a current block (i.e., neighboring blocks) as a good predictor of motion vector information of a current block. Following this idea, the video coder may perform an NBDV derivation process that uses the neighboring disparity information for estimating the disparity vector in different views.

Several spatial and temporal neighboring blocks are defined with regard to the NBDV derivation process for 3D-AVC. In other words, two sets of neighboring blocks are utilized. One set is from spatial neighboring blocks and the other set is from temporal neighboring blocks. The video coder may check each of the spatial and temporal neighboring blocks (i.e., candidate blocks) in a pre-defined order determined by the priority of the correlation between the current block and the candidate blocks. Once the video coder finds a disparity motion vector (i.e., a motion vector that points to an inter-view reference picture) in the candidate blocks, the video coder converts the disparity motion vector to a disparity vector.

As described in U.S. Provisional Application Nos. 61/769,716, filed Feb. 26, 2013 (hereinafter, "the '716 application"), 61/770,263, filed Feb. 27, 2013 (hereinafter, "the '263 application"), 61/772,321, filed Mar. 4, 2013 (hereinafter, "the '321 application"), 61/803,384, filed Mar. 19, 2013 (hereinafter, "the '384 application"), and 61/815, 656, filed Apr. 24, 2013 (hereinafter, "the '656 application"), contents of each of which are incorporated herein by reference, the video coder may use a MB-level NBDV derivation process to derive a disparity vector for a current MB and may further use the disparity vector for motion vector prediction. Once the video coder identifies a disparity motion vector (i.e., once the video coder identifies one of the temporal or spatial neighboring blocks that uses the inter-view reference picture), the disparity motion vector is returned as the disparity vector for the current MB.

In U.S. Provisional Application No. 61/770,268, filed Feb. 27, 2013 (hereinafter, "the '268 application"), the entire content of which is incorporated herein by reference, a video coder can further refine the disparity vector derived from a NBDV derivation process by accessing a corresponding depth block. For example, the video coder can access the depth values of the four corners of the depth block of the reference view (identified by the disparity vector), choose the maximum depth value from among the depth values of the four corners of the depth block, and convert the maximum depth value to a disparity vector.

In the '268 application, BVSP is utilized in a particular way for each 4×4 or 8×8 block and the corresponding depth block is used to produce the disparity motion vector. For instance, for each MB partition, if the MB partition is coded with BVSP mode (i.e., predicted from the synthetic reference component), one refined disparity vector will be derived for each sub-region of the current MB partition. The size of the sub-region may be denoted by K×K (wherein K could be 8), the top-left position of one sub-region within the current MB partition relative to the current picture may be denoted by (x, y), the derived disparity vector from the NBDV derivation process or the updated disparity vector after performing an NBDV derivation process for the current MB may be denoted by (DV[0], DV[1]), wherein DV[0] and DV[1] denote the horizontal and vertical component of the disparity vector. One depth value (D) is selected from the four corner pixels in the reference depth view:

$$D = \max(D0, D1, D2, D3)$$

wherein the function max(•) returns the maximum value of Di (i being 0 to 3) and Di denotes the i-th pixel value which is located at:

i=0: ((x + (DV[0] >> P)) >> reduced_resolution_flag,
(y + (DV[1] >> P)) >> reduced_resolution_flag )
i=1: ((x + (DV[0] >> P) + K−1) >> reduced_resolution_flag,
(y + (DV[1] >> P)) >> reduced_resolution_flag )
i= 2: ((x + (DV[0] >> P)) >> reduced_resolution_flag,
(y + (DV[1] >> P) + K−1) >> reduced_resolution_flag )
i=1: ((x + (DV[0] >> P) + K−1) >> reduced_resolution_flag,
(y + (DV[1] >> P) + K−1) >> reduced resolution flag )

In the equations above, reduced_resolution_flag equal to 1 specifies that the depth view components of a view component pair have a lower spatial resolution than the luma component of the texture view component of the same view component pair, and the width and height of the depth view components are both half of the width and height of all the texture view components. reduced_resolution_flag equal to 0 specifies that when both depth view components and texture view components are present, they have the same spatial resolution. P denotes the precision of disparity vectors which is equal to 2 when the disparity vector is in quarter-pixel precision, 1 for half-pixel precision and 0 for integer-pixel precision.

Alternatively, max (D0, D3) may be used to select the depth value. In another alternative, other pixels within the co-located MB in the reference depth view may be used. The horizontal component of the refined disparity vector may then be converted from the selected depth value for the sub-region within current MB region. The vertical component of the refined disparity vector is always set to 0. In another alternative, the vertical component of the refined disparity vector may be set to the vertical component of the derived disparity vector from NBDV. In some examples, K may be equal to 4, 2 or 1.

As further described in the '268 application, similar to the disparity vector derivation process, the video coder can use the four corners of the depth block (identified by the refined disparity vector) and the video coder may choose the maximum depth value to be converted to a disparity motion vector. For instance, as described in the '268 application, the size of the sub-region may be denoted by K×K (wherein K could be 8), the top-left position of one sub-region within the current MB partition relative to the current picture may be denoted by (x, y), the derived disparity vector from NBDV without use of depth information for the current MB may be denoted by (DV[0], DV[1]), wherein DV[0] and DV[1] denote the horizontal and vertical components of the disparity vector. One depth value (D) is selected from four corner pixels in the reference depth view:

$$D = \max(D0, D1, D2, D3)$$

wherein the function max(•) returns the maximum value of Di (i being 0 to 3) and Di denotes the i-th pixel value which is located at:

i=0: ((x + (DV[0] >> P)) >> reduced_resolution_flag,
(y + (DV[1] >> P)) >> reduced_resolution_flag )
i=1: ((x + (DV[0] >> P) + K−1) >> reduced_resolution_flag,
(y + (DV[1] >> P)) >> reduced_resolution_flag )
i=2: ((x + (DV[0] >> P)) >> reduced_resolution_flag,
(y + (DV[1] >> P) + K−1) >> reduced_resolution_flag )
i=1: ((x + (DV[0] >> P) + K−1) >> reduced _resolution_flag,
(y + (DV[1] >> P) + K−1) >> reduced_resolution_flag )

Here, reduced_resolution_flag equal to 1 specifies that the depth view components of a view component pair have a lower spatial resolution than the luma component of the texture view component of the same view component pair, and the width and height of the depth view components are both half of the width and height of all the texture view components. reduced_resolution_flag equal to 0 specifies that when both depth view components and texture view components are present, they have the same spatial resolution. P denotes the precision of disparity vectors which is equal to 2 when the disparity vector is in quarter-pixel precision, 1 for half-pixel precision, and 0 for integer-pixel precision. In an alternative example, max (D0, D3) may be used to select the depth value. In another example, other pixels within the co-located MB in the reference depth view may be used. The horizontal component of the updated disparity vector may then be converted from the selected depth value for the sub-region within the current MB region. In this example, the vertical component of the updated disparity vector may always be set to 0. In another example, the vertical component of the updated disparity vector may be set to the vertical component of the derived disparity vector from NBDV. Alternatively, K may be equal to 8, 4 or 2. The updated disparity vector may be used for all partitions within the current MB.

For simplicity, the disparity vector derivation process in the '716 application, the '263 application, and the '321 application may be denoted as the NBDV derivation process. A disparity vector derivation processes with refinement, such as that described in the '268 application, may be denoted as NBDV-R. Thus, when a video coder performs the NBDV-R process and when a spatial neighboring block or a temporal neighboring block uses an inter-view reference picture, the video coder may return a disparity motion vector of the spatial neighboring block or the temporal neighboring block as a disparity vector. Furthermore, when the video coder performs the NBDV-R process, the video coder may refine the disparity vector by accessing a corresponding depth block. For instance, when a spatial neighboring block or a temporal neighboring block uses an inter-view reference picture for inter-prediction, the video coder may return a disparity motion vector of the spatial neighboring block or the temporal neighboring block as a disparity vector for the current block. Furthermore, when the video coder performs the NBDV-R process, the video coder may refine the disparity vector for the current block by accessing a corresponding depth block.

Block-based view synthesis prediction (BVSP) was proposed in Su et al., "3DV-CE1.a: Block-based View Synthesis Prediction for 3DV-ATM," Joint Collaborative Team on 3D Video Coding Extension Development of ITU-T SG 16 WP 3 and ISO/IEC JTC 1/SC 29/WG 11, 1st Meeting, Stockholm, SE, 16-20 Jul. 2012, document JCT3V-A0107, hereinafter "JCT3V-A0107". JCT3V-A0107 is available from http://phenix.it-sudparis.eu/jct2/doc_end_user/documents/1_Stockholm/wg11/JCT3V-A0107-v1.zip.

In BVSP, the following coding order may be utilized: (T0, D0, D1, T1). Texture component T0 is in a base view and T1 is in a dependent view coded with the view synthesis picture (VSP). Depth map components D0 and D1 are respective depth maps associated with T0 and T1.

Figure 4:
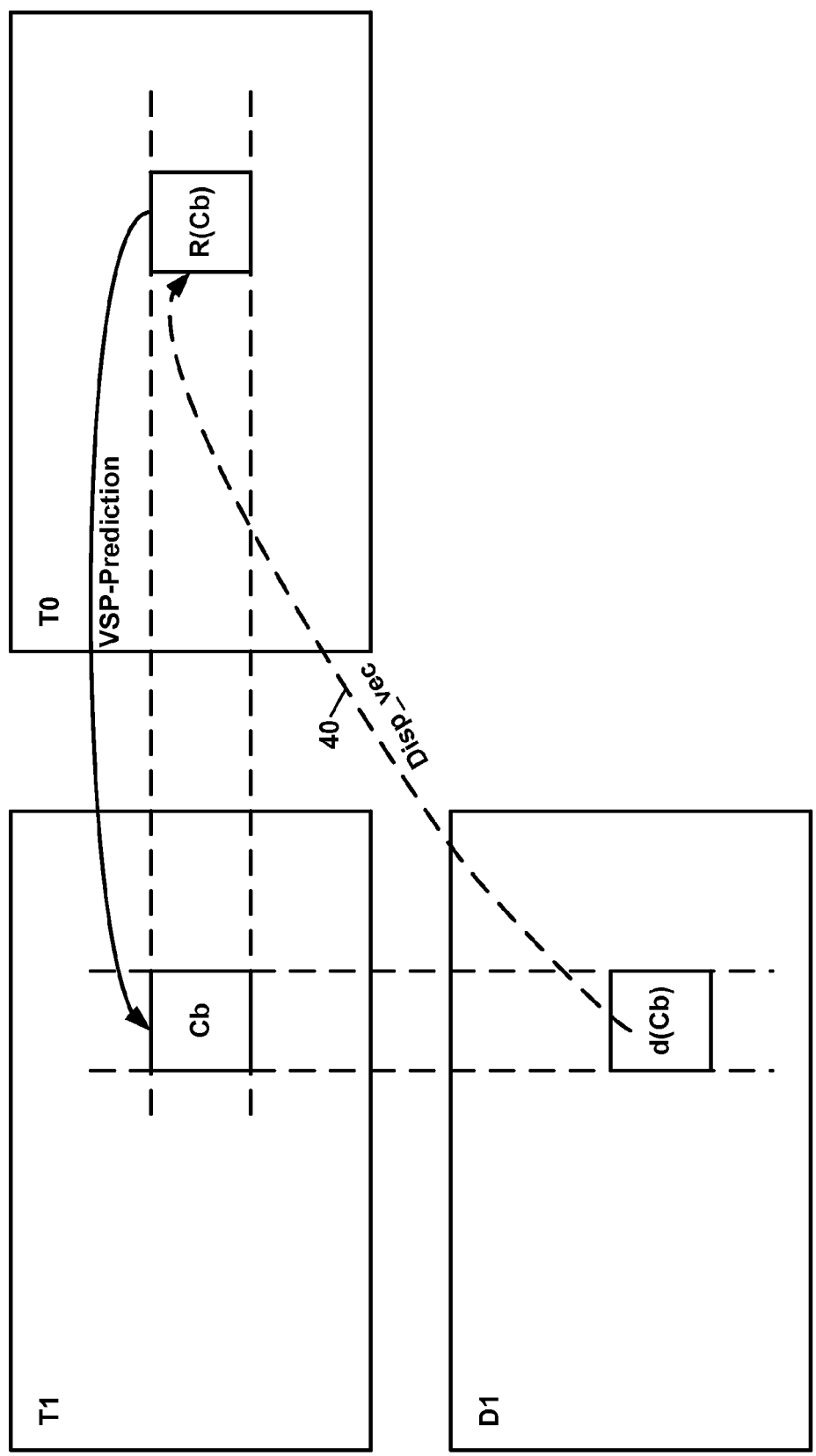
FIG. 4 is a conceptual diagram illustrating an example of block-based view synthesis prediction based on backward warping.

FIG. 4 is a conceptual diagram illustrating an example of block-based view synthesis prediction based on backward warping. As illustrated in FIG. 4, in dependent view T1, sample values of a currently coded block Cb are predicted from reference area R(Cb) that consists of sample values of the base view T0. A displacement vector 40 between coded and reference samples is denoted as a derived disparity vector between T1 and T0 from a depth map value associated with a currently coded texture sample. In some examples, the process of conversion from a depth value to a disparity vector is performed with following equations:

$$Z(Cb(j, i)) = \frac{1}{\frac{d(Cb(j, i))}{255} \cdot \left(\frac{1}{Znear} - \frac{1}{Zfar}\right) + \frac{1}{Zfar}}; \quad (1)$$

$$D(Cb(j, i)) = \frac{f \cdot b}{Z(Cb(j, i))}; \quad (2)$$

In equations (1) and (2) above, Cb is a block currently being coded, j and i are local spatial coordinates within Cb, d(Cb(j,i)) is a depth map value in a depth map image of a view 1, Z is the actual depth value of an object, and D is the horizontal component of a derived disparity vector to a particular view 0. The parameters f, b, Znear and Zfar are parameters specifying the camera setup. Particularly, the used focal length (A camera separation (b) between view 1 and view 0, and depth range (Znear, Zfar) represent parameters of depth map conversion. In this example, the vertical component of the derived disparity vector is always set equal to 0. In some implementations of 3D-AVC (e.g., a 3DV-ATM implementation), equations (1) and (2) have been already pre-computed for every depth map value (0 . . . 255) and stored as a look up-table.

There are several implementation issues with regard to BVSP. For example, one implementation issue concerns the indication of BVSP blocks. In this example, one flag at the MB-level is used to signal whether a current MB is coded with the conventional skip/direct mode or whether the current MB is coded with the skip/direct mode but predicted from a synthetic reference component. Furthermore, in this example, for each MB partition (from 16×16 to 8×8), a reference index in each reference picture list is used to signal the reference picture. When a partition is coded using BVSP mode, motion vector differences are not signaled because there are no motion vectors for BVSP coded blocks. When either the flag or the reference index indicates a synthetic reference component, a video coder may invoke the prediction of one partition as described in the following paragraphs describing BVSP.

Another example implementation issue related to BVSP concerns the prediction derivation process. In this example, for each MB partition with its size denoted by N×M (wherein N or M shall be 8 or 16), if the MB partition is coded with BVSP mode, the video coder further partitions the MB partition into several sub-regions with the size equal to K×K (wherein K may be 4×4, 2×2 or 1×1). For each sub-region, the video coder may derive a separate derived disparity vector and may predict each sub-region from one block located by the derived disparity vector in the inter-view reference picture, e.g., R(cb) in FIG. 4. In some common test conditions, K is defined to be 4. In this example, the derived disparity vectors are not stored for BVSP coded blocks since there are no coding tools that use such vectors.

Another example implementation issue related to BVSP concerns the disparity vector derivation process. In this example, when depth first coding order is applied, a video coder derives the disparity vector by converting a depth value from the corresponding depth block in the corresponding non-base depth view, as shown in FIG. 4. The video coder calculates a single depth value by first accessing the four corner depth samples from the depth block co-located/corresponding to the K×K sub-region and then by taking the maximum value of the four accessed depth samples. The video coder later converts the calculated depth value into a disparity vector using equations (1) and (2). When the video coder applies a texture first coding order, BVSP modes are disabled because the corresponding non-base depth view is unavailable when decoding the non-base texture view.

A simplified disparity vector derivation method is proposed in Bang et al., "3D-CE2.a results on simplification on the disparity vector derivation," Joint Collaborative Team on 3D Video Coding Extension Development of ITU-T SG 16 WP 3 and ISO/IEC JTC 1/SC 29/WG 11, 3$^{rd}$ Meeting, Geneva, CH, 17-23 Jan. 2013, document JCT3V-C0122, hereinafter "JCT3V-C0122." In the method proposed in JCT3V-C0122, when the current MB is coded with inter-prediction modes that are not skip or direct, all the MB partition/sub-blocks with the current MB share the derived disparity vector that is calculated from the bottom-right depth sample of the associated depth block of the current MB. However, when the current MB is coded with a skip or direct mode, the video coder may use a different disparity vector derivation process (i.e., accessing four corner samples of the reference depth block). Furthermore, in BVSP mode, the video coder is still required to access the four corner samples of the reference depth block of each K×K sub-region of an MB partition.

Chen et al., "3D-CE2.a related: MB-level depth-to-DV conversion in ATM," Joint Collaborative Team on 3D Video Coding Extension Development of ITU-T SG 16 WP 3 and ISO/IEC JTC 1/SC 29/WG 11, $3^{rd}$ Meeting, Geneva, CH, 17-23 Jan. 2013, document JCT3V-C0134, hereinafter "JCT3V-C0134," proposes that when coded with inter modes, all partition blocks within the same MB share the single disparity vector, which is derived from a maximum depth value of four corner samples from the same reference depth block which is co-located/corresponding to the current MB. However, for the BVSP mode, the video coder is still required to access the four corner samples of the reference depth block of the each K×K sub-region of an MB partition.

The concept of a macroblock in H.264/AVC does not exist in HEVC. Rather, macroblocks are replaced by a highly flexible hierarchical structure based on a generic quadtree scheme. Within this scheme, four types of blocks, i.e., coding tree units (CTUs), coding units (CUs), prediction units (PUs), and transform units (TUs), are defined. A CTU may also be referred to as a "tree block" or a "largest coding unit" (LCU). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples.

In HEVC, a CU is a basic unit of region splitting. The concept of a CU is analogous to the concept of a macroblock, but a CU is not restricted to a maximum size and a CU allows recursive splitting into four equally-sized CUs to improve the content adaptivity. A PU is a basic unit of inter/intra prediction. In some examples, a PU may contain multiple arbitrarily-shaped partitions in a single PU to effectively code irregular image patterns. A TU is a basic unit of transform. TUs of a CU can be defined independently from PUs of the CU. However, a size of a TU is limited to the CU to which the TU belongs. The separation of the block structure into CUs, PUs, and TUs may allow each to be optimized according to its role, which may result in improved coding efficiency.

In HEVC, video encoder 20 may signal the motion information of a PU using merge mode. The motion information of a PU may include motion vector(s) of the PU and reference index(es) of the PU. When video encoder 20 signals the motion information of a current PU using merge mode in HEVC, video encoder 20 generates a merge candidate list. The merge candidate list includes a set of merge candidates that indicate the motion information of PUs that spatially or temporally neighbor the current PU. Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. Video decoder 30 may obtain, from the bitstream, the index into the candidate list (i.e., a candidate list index). In addition, video decoder 30 may generate the same merge candidate list and may determine, based on the indication of the position of the selected merge candidate, the selected merge candidate. Video decoder 30 may then use the motion information of the selected merge candidate to generate predictive blocks for the current PU.

A 3D video coding extension of HEVC (i.e., 3D-HEVC) is currently being developed. Tech et al., "3D-HEVC Test Model Description draft 2," JCT3V-B1005, Joint Collaborative Team on 3D Video Coding Extension Development of ITU-T SG 16 WP 3 and ISO/IEC JTC 1/SC 29/WG 11, 2nd Meeting: Shanghai, CN, October 2012, hereinafter "JCT3V-B1005," provides a reference software description as well as a working draft of 3D-HEVC.

Like 3D-AVC, 3D-HEVC also uses the concept of disparity vectors. Furthermore, like some versions of 3D-AVC, a video coder implementing 3D-HEVC may perform a NBDV derivation process to derive disparity vectors. 3D-HEVC firstly adopted the NBDV derivation process proposed in Zhang et al., "3D-CE5.h: Disparity vector generation results," Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, document no. JCT3V-A0097 (hereinafter "JCT3V-A0097"). Implicit disparity vectors were included with a simplified NBDV in Sung et al., "3D-CE5.h: Simplification of disparity vector derivation for HEVC-based 3D video coding," Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, document no. JCTVC-A0126 (hereinafter, "JCTVC-A0126"). Furthermore, the NBDV derivation process in 3D-HEVC is further simplified by removing the implicit disparity vectors stored in the decoded picture buffer, while also providing an improved coding gain with random access point (RAP) picture selection, as described in Kang et al., "3D-CE5.h related: Improvements for disparity vector derivation," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document no. JCT3V-B0047 (hereinafter, "JCT3V-B0047").

Figure 5:
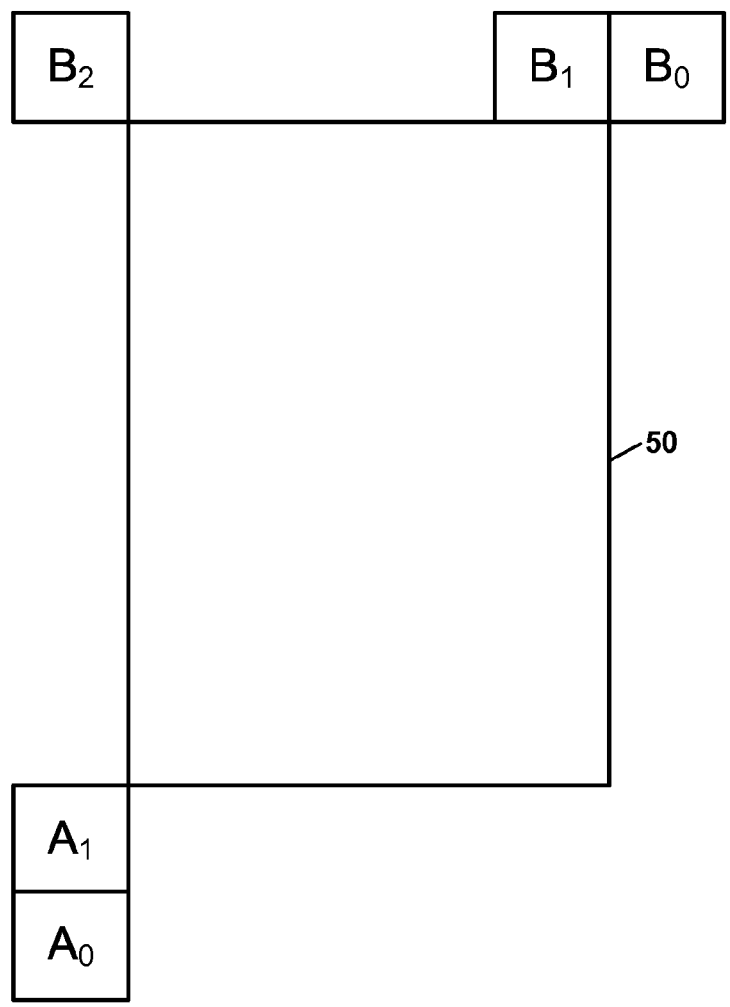
FIG. 5 is a conceptual diagram illustrating examples of spatial motion vector neighbors relative to a current prediction unit in 3D-HEVC.

Like the NBDV derivation process of 3D-AVC, a video coder may check spatial neighboring blocks and temporal neighboring blocks when performing an NBDV derivation process in 3D-HEVC. In some versions of 3D-HEVC, a video coder uses five spatial neighboring blocks the NBDV derivation process. FIG. 5 is a conceptual diagram illustrating examples of spatial motion vector neighbors relative to a current PU 50 in 3D-HEVC. The spatial neighboring blocks are the below-left, left, above-right, above and above-left blocks of current PU 50, as denoted by $A_0$, $A_1$, $B_0$, $B_1$ or $B_2$, as shown in FIG. 5. The five spatial neighboring blocks used in the NBDV derivation process in 3D-HEVC are the same as those used in the merge mode for motion vector prediction in HEVC. Therefore, in 3D-HEVC, it may not be necessary for a video coder to perform additional memory accesses to retrieve information regarding the spatial neighboring blocks during an NBDV derivation process.

When a video coder checks temporal neighboring blocks during an NBDV derivation process in 3D-HEVC, the video coder may first perform a construction process to generate a candidate picture list. The candidate picture list may include one or more candidate pictures. When generating the candidate picture list, the video coder may treat up to two reference pictures from a current view (i.e., a view containing the current picture) as candidate pictures. For instance, when generating the candidate picture list, the video coder may first insert a so-called "co-located reference picture" in the candidate picture list. The video coder may identify the co-located reference picture based on values of syntax elements in a slice header (e.g., a collocated from 10 flag syntax element and a collocated_ref_idx syntax element).

The video coder may then insert additional candidate pictures in the candidate picture list in ascending order of reference index. When reference pictures with the same reference index in both reference picture lists (e.g., RefPicList0 and RefPicList1) are available, the reference picture in the same reference picture list as the co-located picture precedes the other reference picture. For each candidate picture in the candidate picture list, the video coder may determine three candidate regions for deriving the temporal neighboring blocks.

When a block is coded with inter-view motion prediction, a disparity vector needs to be derived for selecting a corresponding block in a different view. The term "implicit disparity vector" (i.e., an "IDV" or a "derived disparity vector") may refer to a disparity vector derived for a block, but not used for inter-view motion prediction of the block. Thus, even though the block is coded with temporal motion prediction (i.e., coded using a motion vector that indicates a location in a reference picture in a different time instance than the current picture), the derived disparity vector is not discarded for purposes of coding a following block.

In some designs of the NBDV derivation process for 3D-HEVC (e.g., 3D-HTM 6.0), the video coder checks disparity motion vectors in temporal neighboring blocks, disparity motion vectors in the spatial neighboring blocks, and then IDVs in order. Once the video coder finds a disparity motion vector or an IDV, the video coder may terminate the NBDV derivation process.

Furthermore, in some versions of 3D-HEVC, when a video coder derives a disparity vector from the NBDV derivation process, the video coder may further refine the disparity vector by retrieving depth data from a depth map of the reference view. In some examples, the refinement process may include two steps. In the first step, the video coder may locate a corresponding depth block by the derived disparity vector in the previously coded reference depth view, such as the base view. The size of the corresponding depth block is the same as that of the current PU. In the second step, the video coder may select one depth value from among the four corner pixels of the corresponding depth block and may convert the selected depth value to the horizontal component of a disparity vector. The video coder may set the vertical component of the disparity vector to 0.

In some versions of 3D-HEVC, the video coder uses the refined disparity vector for inter-view motion prediction while the video coder uses the unrefined disparity vector for inter-view residual prediction. In addition, the video coder may store the refined disparity vector as the motion vector of one PU if the refined disparity vector is coded with backward VSP mode.

Tian et al., "CE1.h: Backward View Synthesis Prediction using Neighboring Blocks," Joint Collaborative Team on 3D Video Coding Extension Development of ITU-T SG 16 WP 3 and ISO/IEC JCT 1/SC 29/WG 11, 3$^{rd}$ Meeting, Geneva, CH, 16-23 Jan. 2013, (hereinafter "JCT3V-C0152") describes a backward-warping VSP approach. During the third JCT-3V meeting, the backward-warping VSP approach as proposed in JCT3V-C0152 was adopted into 3D-HEVC. The basic idea of the backward-warping VSP of JCT3V-C0152 is the same as block-based VSP in 3D-AVC. Both of these two techniques use the backward-warping and block-based VSP to avoid transmitting the motion vector differences and use more precise motion vectors. Implementation details are different due to different platforms. In the following paragraphs, the term "BVSP" is also used to indicate the backward-warping VSP approach in 3D-HEVC.

In some versions of 3D-HEVC, texture first coding is applied in common test conditions. Therefore, the corresponding non-base depth view is unavailable when decoding a non-base texture view. Therefore, a video coder may estimate the depth information and may use the estimated depth information to perform BVSP. In order to estimate the depth information for a block in 3D-HEVC, it has been proposed that the video coder is to first derive a disparity vector from the neighboring blocks and then use the derived disparity vector to obtain a depth block from a reference view.

As described above, some versions (e.g., the HTM 5.1 test model) of 3D-HEVC include a NBDV derivation process. Let $(dv_x, dv_y)$ denote the disparity vector identified from the NBDV derivation process and let the current block position be $(block_x, block_y)$. In some proposals, a video coder fetches a depth block at $(block_x+dv_x, block_y+dv_y)$ in a depth image of the reference view. In such proposals, the fetched depth block has the same size of the current PU. The video coder uses the fetched depth block to perform backward warping for the current PU.

Figure 6:
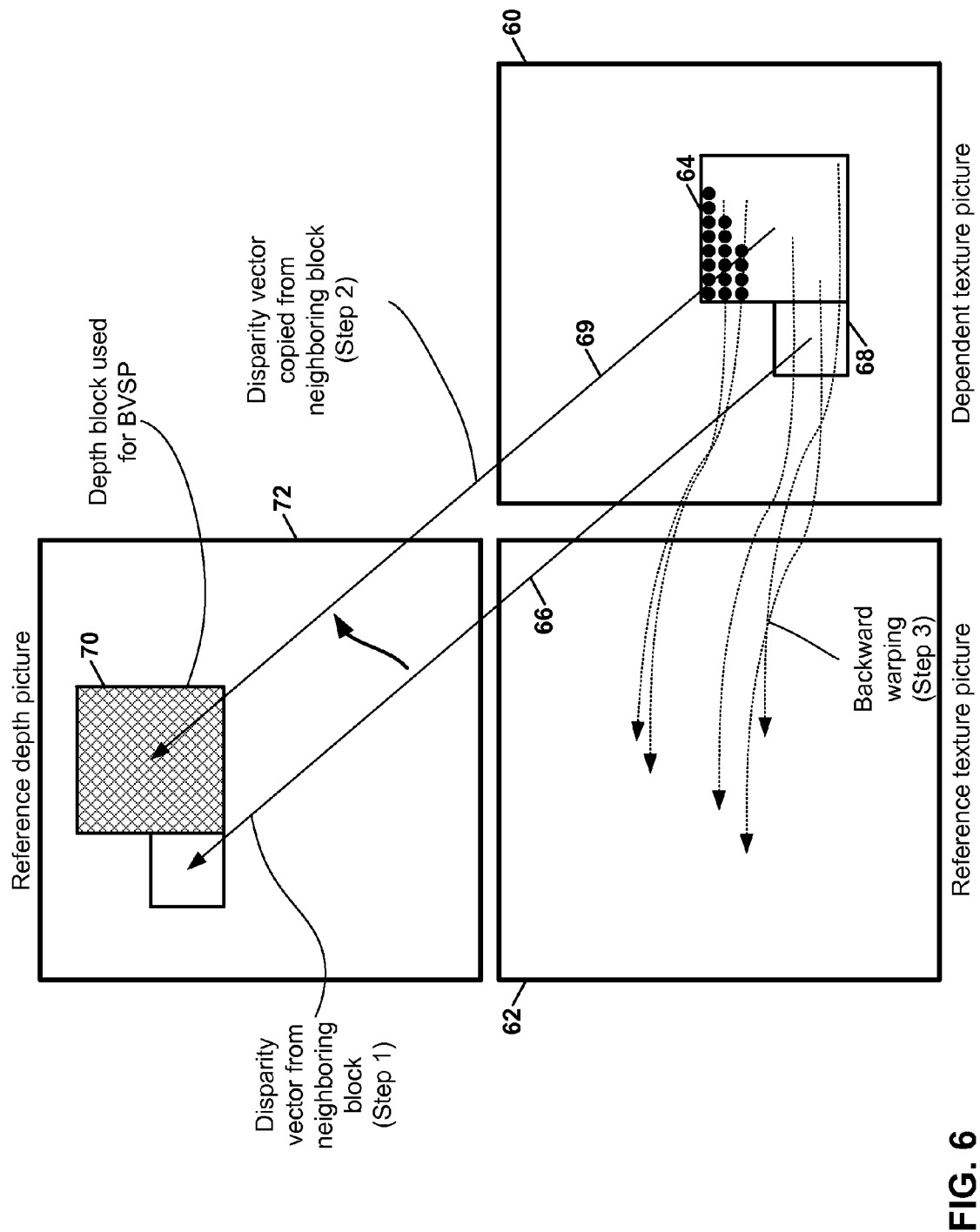
FIG. 6 is a conceptual diagram illustrating depth block derivation from a reference view for block-based view synthesis prediction.

FIG. 6 is a conceptual diagram illustrating depth block derivation from a reference view to perform BVSP prediction. In the example of FIG. 6, a video coder is coding a current texture picture 60. Current texture picture 60 is labeled a "dependent texture picture" because current texture picture 60 is dependent on a synthesized reference texture picture 62. In other words, the video coder may need to synthesize reference texture picture 62 in order to decode current texture picture 60. Reference texture picture 62 and current texture picture 60 are in the same access unit but are in different views.

In order to synthesize reference texture picture 62, the video coder may process blocks (i.e., video units) of current texture picture 60. In the example of FIG. 6, the video coder is processing a current block 64. When the video coder processes current block 64, the video coder may perform the NBDV process to derive a disparity vector for current block 64. For instance, in the example of FIG. 6, the video coder identifies a disparity vector 66 of a block 68 that neighbors current block 64. The identification of disparity vector 66 is shown as Step 1 of FIG. 6. Furthermore, in the example of FIG. 6, the video coder determines, based on disparity vector 66, a disparity vector 69 of current block 64. For instance, disparity vector 69 may be a copy of disparity vector 66. Copying disparity vector 66 is shown as Step 2 of FIG. 6.

The video coder may identify, based on disparity vector 69 of current block 64, a reference block 70 in a reference depth picture 72. Reference depth picture 72, current texture picture 60, and reference texture picture 62 may each be in the same access unit. Reference depth picture 72 and reference texture picture 62 may be in the same view. The video coder may determine, based on texture sample values of current block 64 and depth sample values of reference block 70, texture sample values of reference texture picture 62. The process of determining the texture sample values may be referred to as backward warping. Section H.8.5.2.2.7 of 3D-HEVC Test Model 3 describes the process of backward warping. Backward warping is shown as Step 3 of FIG. 6. In this way, FIG. 6 illustrates the three steps of how a depth block from the reference view is located and then used for BVSP prediction.

In 3D-HEVC, if BVSP is enabled in the sequence, the NBDV derivation process for inter-view motion prediction is changed and the differences are shown in bold italics:

For each of the temporal neighboring blocks, if the temporal neighboring block uses a disparity motion vector, the disparity motion vector is returned as the disparity vector and the disparity vector is further refined with one or more of the example methods described elsewhere in this disclosure.

For each of the spatial neighboring blocks, the following apply:

For each of reference picture list 0 or reference picture list 1, the following apply:

If the spatial neighboring block uses a disparity motion vector, the disparity motion vector is returned as the disparity vector and the disparity vector is further refined with one or more example methods described elsewhere in this disclosure.

Otherwise, if the spatial neighboring block uses BVSP mode, the associated motion vector is returned as the disparity vector. The disparity vector is further refined in a similar way as described in one or more example methods described elsewhere in this disclosure. However, the maximum depth value is selected from all pixels of the corresponding depth block rather than four corner pixels.

For each of the spatial neighboring blocks, if the spatial neighboring block uses an IDV, the IDV is returned as the disparity vector and the disparity vector is further refined with the method described in one or more example methods described elsewhere in this disclosure.

In 3D-HEVC, the introduced BVSP mode is treated as a special inter-coded (i.e., inter prediction) mode and a video coder should maintain flags to indicate the usage of BVSP mode for each PU. However, rather than signaling the flags in the bitstream, a video coder may add a new merging candidate (i.e., a BVSP merging candidate) to the merge candidate list and the flag is dependent on whether the decoded merge candidate index corresponds to a BVSP merging candidate. In some proposals, the BVSP merging candidate is defined as follows:

Reference picture index for each reference picture list: −1
Motion vector for each reference picture list: the refined disparity vector The inserted position of a BVSP merging candidate may be dependent on the spatial neighboring blocks. For instance, if any of the five spatial neighboring blocks ($A_0$, $A_1$, $B_0$, $B_1$ or $B_2$) is coded with the BVSP mode (i.e., the maintained flag of the neighboring block is equal to 1), the video coder may treat the BVSP merging candidate as the corresponding spatial merging candidate and may insert the BVSP merging candidate into the merge candidate list. The video coder may only insert the BVSP merging candidate into the merge candidate list once. Otherwise (i.e., none of the five spatial neighboring blocks are coded with the BVSP mode), the video coder may insert the BVSP merging candidate into the merge candidate list just before the temporal merging candidates. During a combined bi-predictive merging candidate derivation process, the video coder may check additional conditions to avoid including the BVSP merging candidate.

Furthermore, in at least some versions of 3D-HEVC, a video coder may perform a prediction derivation process. For instance, for each BVSP-coded PU (with the size of the BVSP-coded PU denoted by N×M), the video coder may further partition the BVSP-coded PU into several sub-regions with the size equal to K×K (where K may be 4 or 2). For each sub-region, the video coder may derive a separate disparity motion vector and the video coder may predict each sub-region from one block located by the derived disparity motion vector in the inter-view reference picture. In other words, the video coder may set the size of motion-compensation units for BVSP coded PUs to K×K. In some common test conditions, K is set to 4.

For each sub-region (i.e., 4×4 block) within one PU coded with BVSP mode, the video coder may firstly locate a corresponding 4×4 depth block in the reference depth view with the refined disparity vector aforementioned above. Secondly, the video coder may select the maximum value of the sixteen depth pixels in the corresponding depth block. Thirdly, the video coder may convert the maximum value to the horizontal component of a disparity motion vector. The video coder may set the vertical component of the disparity motion vector to 0.

In 3D-HEVC, when the texture first coding order is applied, for each PU, a disparity vector could be derived from NBDV with/without consideration of the depth values in the reference depth view. After a disparity vector is obtained, the video coder may further refine the disparity vector for each 4×4 sub-region of one PU if the PU is coded with BVSP mode. In some examples, the refinement process includes two steps. In the first step, the video coder may select one maximum depth value from the 4×4 depth block in the reference depth view which is located by the derived disparity vector. In the second step, the video coder may convert the depth value to a horizontal component of the refined disparity vector while keeping the vertical component of the refined disparity vector to be 0. After the video coder refines the disparity vector for one 4×4 sub-region of one PU, the video coder may use the refined disparity vector to locate a block in the reference texture view for motion compensation.

In some cases, the NBDV derivation processes described in U.S. Provisional Application Nos. 61/769,716, 61/770, 263, 61/772,321, and 61/770,268, when applied to skip/direct mode of 3D-AVC may possibly present several issues. For example, the blocks coded with skip/direct mode use a disparity vector which is a function of NBDV results (i.e., disparity vectors resulting from NBDV derivation processes), no matter with refinement or not by accessing the depth, and the spatial neighboring blocks. In other words, NBDV is first invoked to derive a disparity motion vector, which is further considered jointly with disparity motion vectors that are available in the spatial neighbors to get a final disparity vector to access the reference view. Therefore, an inconsistent disparity vector may be used eventually for different modes. In another example, both the NBDV process itself and the process in skip/direct mode need to check the spatial neighboring blocks for disparity motion vectors. This fact may lead to unnecessary checks of the spatial neighboring blocks multiple times. In another example, the final disparity vector for a block using skip/direct mode is calculated based on a median filtering process of multiple disparity (motion) vectors, which may bring only marginal coding benefit but some complexity increase.

In accordance with the techniques described in this disclosure, a video coder (e.g., a video encoder or a video decoder) may be configured to implement the proposed techniques, which may simplify the NBDV and/or the processes required by skip and direct modes in 3D-AVC. In other words, to address the possible issues mentioned above, the methods are proposed to simplify the NBDV derivation process and/or the processes required by skip and direct modes in 3D-AVC.

For instance, when a video coder performs an NBDV derivation process, the video coder may, instead of checking the temporal neighboring blocks first, check the spatial neighboring blocks first. In addition, in skip and direct mode, a disparity vector, as the result of NBDV, is directly used for the current block without further checking spatial neighboring blocks. In this case, the video coder does not use median filtering. Thus, in this example, as part of performing an NBDV derivation process, a video coder may check one or more spatial neighboring blocks for disparity motion vectors and may then check one or more temporal neighboring blocks for disparity motion vectors. When one of the spatial or temporal neighboring blocks uses an inter-view reference picture, the video coder may return a disparity motion vector of the spatial or temporal neighboring block.

Furthermore, in some examples, when accessing a depth map is disallowed, the video coder may always set the disparity vector for skip/direct mode equal to the NBDV result. When accessing a depth map is allowed, the video coder may set the disparity vector for skip/direct mode as one of the following examples. In a first example, the video coder always sets the disparity vector to the disparity vector of the NBDV-R process. Thus, in this example, when accessing a depth map is allowed, a video coder may set the disparity vector for the current block to the disparity vector determined by the NBDV-R derivation process. When accessing the depth map is not allowed, the video coder may set the disparity vector for the current block to the disparity vector determined by the NBDV process.

In a second example where accessing a depth map is allowed, if the disparity vector of the NBDV derivation process is from a spatial neighboring block, the video coder sets the disparity vector to the disparity vector of the NBDV process. Otherwise, in this second example, the video coder sets the disparity vector to the disparity vector of the NBDV-R process. Thus, in this example, when accessing a depth map is not allowed, the video coder may set the disparity vector for the current block to the disparity vector determined by the NBDV derivation process. Furthermore, in this example, when accessing the depth map is allowed and the disparity vector determined by the NBDV derivation process is from a spatial neighboring block, the video coder may set the disparity vector for the current block to the disparity vector determined by the NBDV derivation process. When accessing the depth map is allowed and the disparity vector determined by the NBDV derivation process is not from a spatial neighboring block, the video coder may set the disparity vector for the current block to the disparity vector determined by the NBDV-R process.

In a third example where accessing the depth map is allowed, the video coder always sets the disparity vector to the disparity vector of the NBDV process. Thus, in this example, when accessing a depth map is not allowed, a video coder may set the disparity vector for the current block to the disparity vector determined by the NBDV derivation process. When accessing the depth map is allowed, the video coder may set the disparity vector for the current block to the disparity vector determined by the NBDV derivation process.

In one example of this disclosure, the NBDV derivation process described in the '268 application is not necessarily changed. However, for a video block that is coded in the skip/direct mode, only when the disparity vector of the NBDV derivation process is from a disparity motion vector of a temporal neighboring block, spatial neighboring blocks are checked in a certain order. In other words, in this example, if a spatial neighboring block that the video coder is checking contains an available disparity motion vector, the video coder sets the available disparity motion vector to the disparity vector of the current block. Otherwise (i.e., no disparity motion vector found for all of them), the video coder uses the NBDV or NBDV-R result for the current block. In this case, the video coder does not use median filtering.

For example, a checking order of spatial neighboring blocks is defined as A, B, C and D (A, B, C, and D as in NBDV and as shown in FIG. 3). Once the video coder identifies a disparity motion vector, the video coder selects the disparity motion vector. In another example, when more than one spatial neighboring block contains a disparity motion vector, the video coder may derive a disparity motion vector with a mathematical function from available spatial neighboring blocks and may use the derived disparity motion vector as the disparity vector for the current block.

In this way, when a disparity vector determined by an NBDV derivation process is from a disparity motion vector of a temporal neighboring block, a video coder may check spatial neighboring blocks in a particular order. When checking one of the spatial neighboring blocks, if the spatial neighboring block contains an available disparity motion vector, the video coder may set the available disparity motion vector to the disparity vector for the current block. Furthermore, when none of the spatial neighboring blocks contains a disparity motion vector, the video coder may use the disparity vector determined by the NBDV derivation process or the disparity vector determined by the NBDV-R process as the disparity vector for the current block. In some instances, the particular order is: left spatial neighboring block (A), above spatial neighboring block (B), above-right spatial neighboring block (C), and above-left spatial neighboring block (D). In another example, when more than one of the spatial neighboring blocks contains a disparity motion vector, the video coder may derive a disparity motion vector with a mathematical function from disparity motion vectors of the spatial neighboring blocks and may use the derived disparity motion vector as the disparity vector for the current block.

Furthermore, in some examples of this disclosure, when the current block is coded with skip/direct mode, instead of further checking spatial blocks and potentially utilizing median filtering, the video coder directly uses the disparity vector derived from NBDV or NBDV-R for the current block. In this case, the video coder does not use median filtering.

Thus, in accordance with one or more example techniques of this disclosure, video encoder 20 may perform a NBDV derivation process to determine a disparity vector or perform an NBDV-R process to determine the disparity vector. In such examples, video encoder 20 may use the disparity vector as a disparity vector for a current block of the video data without using a median filtering process on multiple disparity motion vectors, wherein the current block is coded in either a skip mode or a direct mode. The video coder does not use the median filtering process even if there are potentially other neighboring blocks with available disparity motion vectors. Furthermore, video encoder 20 may entropy encode at least some syntax elements for a current slice that includes the current block.

Similarly, in accordance with one or more example techniques of this disclosure, video decoder 30 may perform a NBDV derivation process to determine a disparity vector or perform an NBDV-R process to determine the disparity vector. In such examples, video decoder 30 may use the disparity vector as a disparity vector for a current block of the video data without using a median filtering process on multiple disparity motion vectors, wherein the current block is coded in either a skip mode or a direct mode. Furthermore, video decoder 30 may determine pixel values for the current block.

Figure 7:
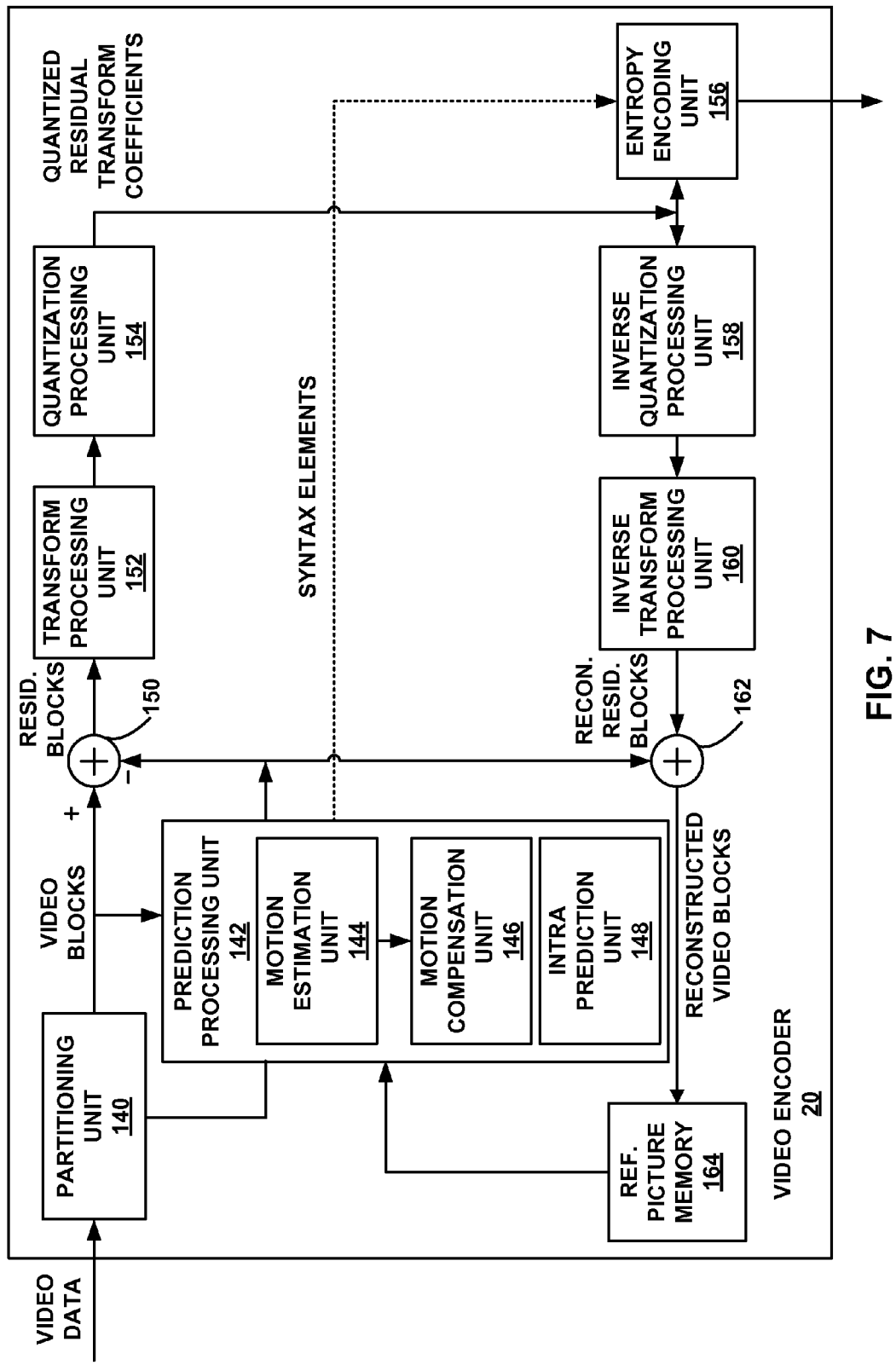
FIG. 7 is a block diagram illustrating an example video encoder that may implement the techniques described in this disclosure.

FIG. 7 is a block diagram illustrating an example of a video encoder that may implement the techniques described in this disclosure. In the example of FIG. 7, video encoder 20 may perform intra- and inter-coding of video blocks within slices. For example, video encoder 20 may perform inter-prediction encoding or intra-prediction encoding. Intra-coding relies on spatial prediction to reduce or remove spatial redundancy in video within a given video frame or picture. Inter-coding relies on temporal prediction or inter-view prediction to reduce or remove temporal redundancy within adjacent frames or pictures of a video sequence or redundancy between pictures in different views. Intra-mode (I mode) may refer to any of several spatial based compression modes. Inter-modes, such as uni-directional prediction (P mode) or bi-prediction (B mode), may refer to any of several temporal-based compression modes.

In the example of FIG. 7, video encoder 20 includes a partitioning unit 140, a prediction processing unit 142, a reference picture memory 164, a summer 150, a transform processing unit 152, a quantization processing unit 154, and an entropy encoding unit 156. Prediction processing unit 142 includes a motion estimation unit 144, a motion compensation unit 146, and an intra-prediction unit 148. For video block reconstruction, video encoder 20 also includes an inverse quantization processing unit 158, an inverse transform processing unit 160, and a summer 162. Video encoder 20 may also include a deblocking filter (not shown in FIG. 7) to filter block boundaries to remove blockiness artifacts from reconstructed video. If desired, the deblocking filter would typically filter the output of summer 162. Additional loop filters (in loop or post loop) may also be used in addition to the deblocking filter. Reference picture memory 164 is one example of a decoding picture buffer (DPB).

As shown in FIG. 7, video encoder 20 receives video data, and partitioning unit 140 partitions the data into video blocks. This partitioning may also include partitioning into slices, tiles, or other larger units, as well as video block partitioning (e.g., macroblock partitions and sub-blocks of partitions). Video encoder 20 generally illustrates the components that encode video blocks within a slice to be encoded. The slice may be divided into multiple video blocks (and possibly into sets of video blocks referred to as tiles). Prediction processing unit 142 may select one of a plurality of possible coding modes, such as one of a plurality of intra coding modes or one of a plurality of inter coding modes, for the current video block based on error results (e.g., coding rate and the level of distortion). Prediction processing unit 142 may provide the resulting intra- or inter-coded block to summer 150 to generate residual block data and to summer 162 to reconstruct the encoded block for use as a reference picture.

Intra-prediction unit 148 within prediction processing unit 142 may perform intra-predictive coding of the current video block relative to one or more neighboring blocks in the same frame or slice as the current block to be coded to provide spatial compression. Motion estimation unit 144 and motion compensation unit 146 within prediction processing unit 142 perform inter-predictive coding of the current video block relative to one or more predictive blocks in one or more reference pictures to provide temporal compression.

Motion estimation unit 144 may be configured to determine the inter-prediction mode for a slice according to a predetermined pattern for a video sequence. The predetermined pattern may designate slices in the sequence as P slices or B slices. Motion estimation unit 144 and motion compensation unit 146 may be highly integrated, but are illustrated separately for conceptual purposes. Motion estimation, performed by motion estimation unit 144, is the process of generating motion vectors, which estimate motion for video blocks. A motion vector, for example, may indicate the displacement of a video block within a current video frame or picture relative to a predictive block within a reference picture.

A predictive block is a block that is found to closely match the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 164. For example, video encoder 20 may interpolate values of one-quarter pixel positions, one-eighth pixel positions, or other fractional pixel positions of the reference picture. Therefore, motion estimation unit 144 may perform a motion search relative to the full pixel positions and fractional pixel positions and output a motion vector with fractional pixel precision.

Motion estimation unit 144 calculates a motion vector for a video block in an inter-coded slice by comparing the position of the video block to the position of a predictive block of a reference picture. The reference picture may be selected from a first reference picture list (RefPicList0) or a second reference picture list (RefPicList1), each of which identify one or more reference pictures stored in reference picture memory 164. Motion estimation unit 144 sends the calculated motion vector to entropy encoding unit 156 and motion compensation unit 146.

Motion compensation, performed by motion compensation unit 146, may involve fetching or generating the predictive block based on the motion vector determined by motion estimation, possibly performing interpolations to sub-pixel precision. Upon receiving the motion vector for the current video block, motion compensation unit 146 may locate the predictive block to which the motion vector points in one of the reference picture lists. Summer 150 may form a residual block in which pixel values indicate differences between samples in the predictive block and corresponding pixel values in the current video block. In some examples, summer 150 forms a residual video block by subtracting pixel values of the predictive block from corresponding pixel values of the current video block being coded, forming pixel difference values. The pixel difference values form residual data for the block, and may include both luma and chroma difference components. Summer 150 may represent the component or components that perform this subtraction operation. Motion compensation unit 146 may also generate syntax elements associated with the video blocks and the slice for use by video decoder 30 in decoding the video blocks of the slice.

Intra-prediction unit 148 may intra-predict a current block, as an alternative to the inter-prediction performed by motion estimation unit 144 and motion compensation unit 146, as described above. In particular, intra-prediction unit 148 may determine an intra-prediction mode to use to encode a current block. In some examples, intra-prediction unit 148 may encode a current block using various intra-prediction modes, e.g., during separate encoding passes, and intra-prediction unit 148 (or a mode select unit, in some examples) may select an appropriate intra-prediction mode to use from the tested modes. For example, intra-prediction unit 148 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 148 may calculate ratios from the distortions and rates for the various encoded blocks to determine which intra-prediction mode exhibits the best rate-distortion value for the block.

In any case, after selecting an intra-prediction mode for a block, intra-prediction unit 148 may provide information indicative of the selected intra-prediction mode for the block to entropy encoding unit 156. Entropy encoding unit 156 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

In accordance some techniques of this disclosure, prediction processing unit 142 performs an NBDV derivation process to determine a disparity vector or performs an NBDV-R process to determine the disparity vector. Furthermore, prediction processing unit 142 may use the disparity vector as a disparity vector for a current block of video data without using a median filtering process on multiple disparity motion vectors, wherein the current block is coded in either a skip mode or a direct mode. For instance, prediction processing unit 142 may use the disparity vector for the current block to perform inter-view motion prediction and/or inter-view residual prediction with regard to the current block.

After prediction processing unit 142 generates the predictive block for the current video block via either inter-prediction or intra-prediction, video encoder 20 forms a residual video block. In some examples, summer 150 forms the residual video block by subtracting the predictive block from the current video block. Transform processing unit 152 may transform the residual block into residual transform coefficients using a transform, such as a discrete cosine transform (DCT) or a conceptually similar transform. Transform processing unit 152 may convert the residual video data from a pixel domain to a transform domain, such as a frequency domain.

Transform processing unit 152 may send the resulting transform coefficients to quantization processing unit 154. Quantization processing unit 154 may quantize the transform coefficients to further reduce bit rate. The quantization process may reduce the bit depth associated with some or all of the coefficients. The degree of quantization may be modified by adjusting a quantization parameter. In some examples, quantization processing unit 154 may then perform a scan of the matrix including the quantized transform coefficients. Alternatively, entropy encoding unit 156 may perform the scan.

Following quantization, entropy encoding unit 156 may entropy encode the quantized transform coefficients. In other words, entropy encoding unit 156 may entropy encode syntax elements corresponding to the quantized transform coefficients. In different examples, entropy encoding unit 156 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 156, the encoded bitstream may be transmitted to video decoder 30, or archived for later transmission or retrieval by video decoder 30. Entropy encoding unit 156 may also entropy encode the motion vectors and the other syntax elements for the slice currently being coded. For instance, entropy encoding unit 156 may entropy encode syntax elements corresponding to motion vectors.

To perform CABAC, entropy encoding unit 156 may assign a context within a context model to a symbol to be transmitted. For example, the context may relate to whether neighboring values of the symbol are non-zero or not. To perform CAVLC, entropy encoding unit 156 may select a variable length code for a symbol to be transmitted. Codewords in variable length coding (VLC) may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Inverse quantization processing unit 158 and inverse transform processing unit 160 apply inverse quantization and inverse transformation, respectively, to reconstruct the residual block in the pixel domain for later use as a reference block of a reference picture. Motion compensation unit 146 may calculate a reference block by adding the residual block to a predictive block of one of the reference pictures within one of the reference picture lists. Motion compensation unit 146 may also apply one or more interpolation filters to the reconstructed residual block to calculate sub-integer pixel values for use in motion estimation. Summer 162 adds the reconstructed residual block to the motion compensated prediction block produced by motion compensation unit 146 to produce a reference block for storage in reference picture memory 164. The reference block may be used by motion estimation unit 144 and motion compensation unit 146 as a reference block to inter-predict a block in a subsequent video frame or picture. In this way, reference picture memory 164 is a memory storing video data.

In this manner, video encoder 20 is an example of a video encoder that is configured to implement one or more example techniques described in this disclosure. For example, prediction processing unit 142 may be configured to implement the example techniques. In some examples, a unit other than prediction processing unit 142 may implement the examples described above. In some examples, prediction processing unit 142 in conjunction with one or more other units of video encoder 20 may implement the examples described above. In some examples, a processor or unit of video encoder 20 (not shown in FIG. 7) may, alone or in conjunction with other units of video encoder 20, implement the examples described above.

Figure 8:
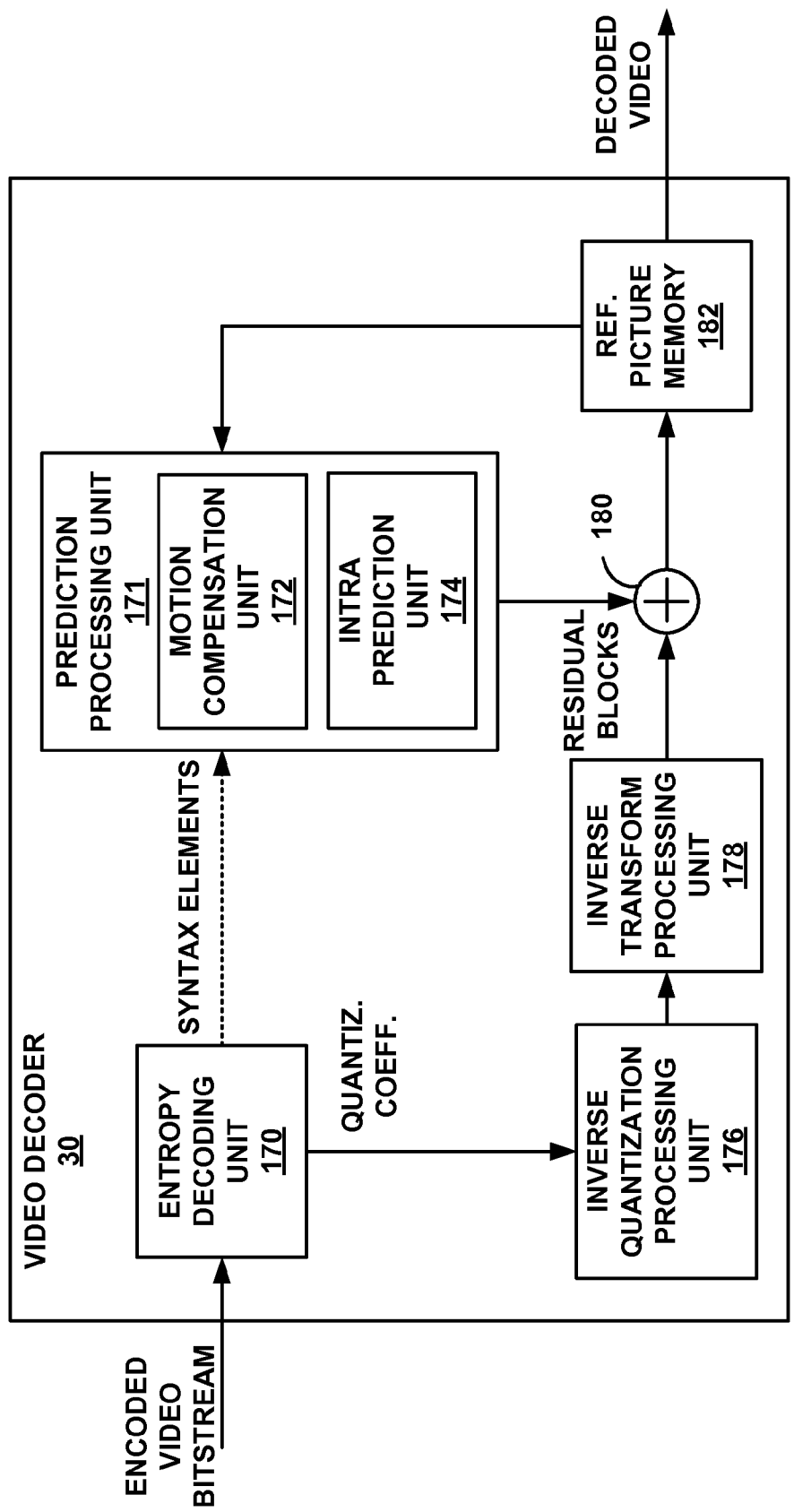
FIG. 8 is a block diagram illustrating an example video decoder that may implement the techniques described in this disclosure.

FIG. 8 is a block diagram illustrating an example of video decoder 30 that may implement the techniques described in this disclosure. In the example of FIG. 8, video decoder 30 may perform inter-prediction decoding or intra-prediction decoding. In the example of FIG. 8, video decoder 30 includes an entropy decoding unit 170, a prediction processing unit 171, an inverse quantization processing unit 176, an inverse transform processing unit 178, a summer 180, and a reference picture memory 182. Prediction processing unit 171 includes a motion compensation unit 172 and an intra prediction unit 174. In some examples, video decoder 30 performs a decoding pass generally reciprocal to the encoding pass described with respect to video encoder 20 from FIG. 7. Reference picture memory 182 is one example of a decoded picture buffer (DPB).

During the decoding process, video decoder 30 receives an encoded video bitstream that represents video blocks of an encoded slice and associated syntax elements from video encoder 20. Entropy decoding unit 170 of video decoder 30 may entropy decode particular syntax elements of the bitstream to obtain quantized coefficients, motion vectors, and other syntax elements. Entropy decoding unit 170 may forward the motion vectors and other syntax elements to prediction processing unit 171. Video decoder 30 may receive the syntax elements at the slice level and/or the video block level.

When the slice is coded as an intra-coded (I) slice, intra-prediction unit 174 of prediction processing unit 171 may generate prediction data for a video block of the slice based on a signaled intra prediction mode and data from previously decoded blocks of the current frame or picture. When the video frame is coded as an inter-coded (i.e., B or P) slice, motion compensation unit 172 of prediction processing unit 171 produces predictive blocks for a video block of the current slice based on the motion vectors and other syntax elements received from entropy decoding unit 170. Motion compensation unit 172 may produce predictive blocks from one of the reference pictures within one of the reference picture lists. Video decoder 30 may construct the reference picture lists (RefPicList0 and RefPicList1) using default construction techniques based on reference pictures stored in reference picture memory 182.

Motion compensation unit 172 may determine prediction information for a video block of the current slice by processing the motion vectors and other syntax elements, and may use the prediction information to produce the predictive blocks for the current video block currently being decoded. For example, motion compensation unit 172 uses some of the received syntax elements to determine a prediction mode (e.g., intra- or inter-prediction) used to code the video blocks of the slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the slice.

Motion compensation unit 172 may also perform interpolation based on interpolation filters. Motion compensation unit 172 may use interpolation filters as used by video encoder 20 during encoding of the video blocks to calculate interpolated values for sub-integer pixels of reference blocks. In this case, motion compensation unit 172 may determine the interpolation filters used by video encoder 20 from the received syntax elements and may use the interpolation filters to produce predictive blocks.

In accordance with some examples of this disclosure, prediction processing unit 171 performs an NBDV derivation process to determine a disparity vector or performs an NBDV-R process to determine the disparity vector. Furthermore, prediction processing unit 171 may use the disparity vector as a disparity vector for a current block of the video data without using a median filtering process on multiple disparity motion vectors, wherein the current block is coded in either a skip mode or a direct mode. For instance, prediction processing unit 171 may use the disparity vector for the current block to perform inter-view motion prediction and/or inter-view residual prediction with regard to the current block.

Inverse quantization processing unit 176 inverse quantizes (i.e., de-quantizes), the quantized transform coefficients provided by syntax elements obtained from the bitstream and decoded by entropy decoding unit 170. The inverse quantization process may include use of a quantization parameter calculated by video encoder 20 for each video block in the slice to determine a degree of quantization and, likewise, a degree of inverse quantization that should be applied. Inverse transform processing unit 178 applies an inverse transform (e.g., an inverse DCT, an inverse integer transform, or a conceptually similar inverse transform process), to the transform coefficients in order to produce residual blocks in the pixel domain.

After motion compensation unit 172 generates the predictive block for the current video block based on the motion vectors and other syntax elements, summer 180 may form a decoded video block. In some examples, summer 180 may form the decoded video block by summing the residual blocks from inverse transform processing unit 178 with the corresponding predictive blocks generated by motion compensation unit 172. Summer 180 represents the component or components that perform this summation operation. If desired, a deblocking filter may also be applied to filter the decoded blocks in order to remove blockiness artifacts. Video decoder 30 may also use other loop filters (either in the coding loop or after the coding loop) to smooth pixel transitions, or otherwise improve the video quality. Reference picture memory 182 then stores the decoded video blocks in a given picture for subsequent motion compensation. Reference picture memory 182 may also store decoded video for later presentation on a display device, such as display device 32 of FIG. 1. In this way, reference picture memory 182 is a memory storing video data.

In this manner, video decoder 30 is an example of a video decoder that is configured to implement one or more example techniques described in this disclosure. For example, prediction processing unit 171 may be configured to implement the example techniques. In some examples, a unit other than prediction processing unit 171 may implement the examples described above. In some examples, prediction processing unit 171 in conjunction with one or more other units of video decoder 30 may implement the examples described above. In yet other examples, a processor or unit of video decoder 30 (not shown in FIG. 8) may, alone or in conjunction with other units of video decoder 30, implement the examples described above.

Figures 9A, 9B:
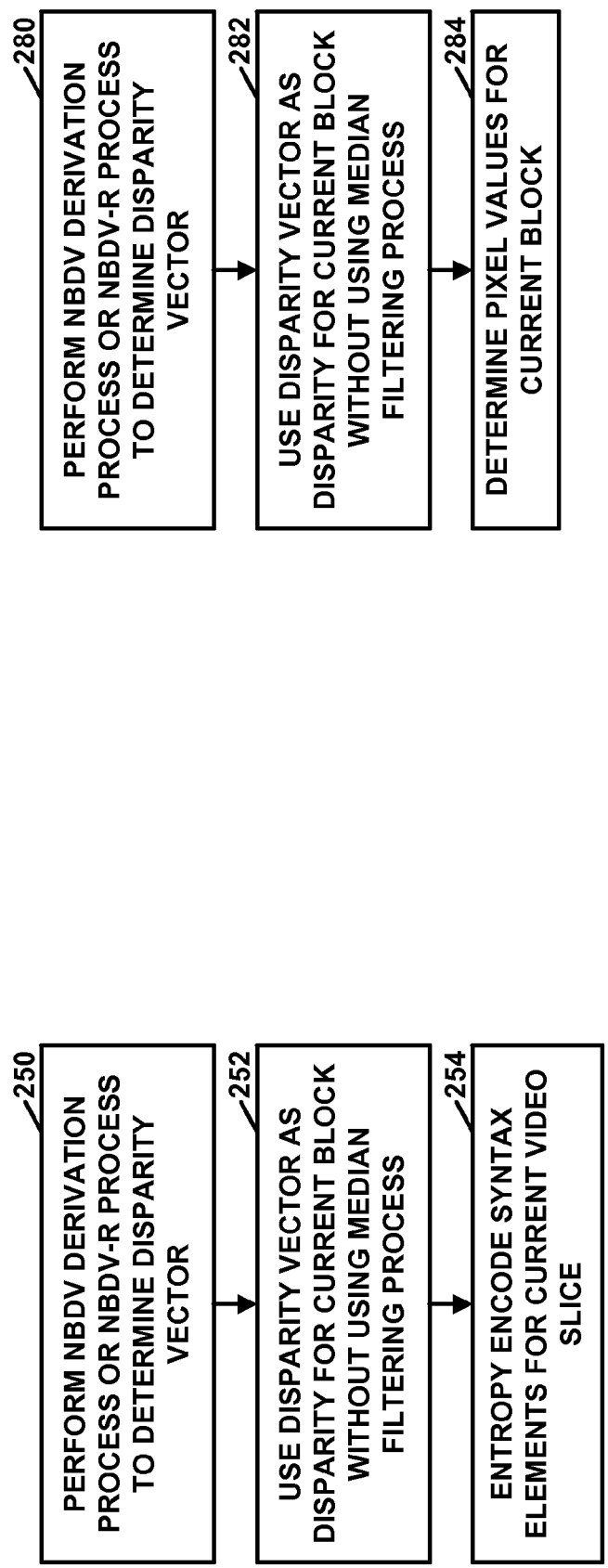
FIG. 9A is a flowchart illustrating an example operation of a video encoder, in accordance with one or more techniques of this disclosure.
FIG. 9B is a flowchart illustrating an example operation of a video decoder, in accordance with one or more techniques of this disclosure.

FIG. 9A is a flowchart illustrating an example operation of video encoder 20, in accordance with one or more techniques of this disclosure. In the example of FIG. 9A, video encoder 20 performs a NBDV derivation process to determine a disparity vector or perform an NBDV-R process to determine the disparity vector (250). Video encoder 20 may use (e.g., set) the disparity vector as a disparity vector for a current block of the video data without using a median filtering process on multiple disparity motion vectors (252). In the example of FIG. 9A, the current block is coded in either a skip mode or a direct mode (e.g., video encoder 20 encodes the current block in either a skip mode or a direct mode). Furthermore, video encoder 20 (e.g., entropy encoding unit 156 of video encoder 20) may entropy encode at least some syntax elements for a current slice that includes the current block (254).

FIG. 9B is a flowchart illustrating an example operation of video decoder 30, in accordance with one or more techniques of this disclosure. In the example of FIG. 9B, video decoder 30 performs an NBDV derivation process to determine a disparity vector or performs an NBDV-R process to determine the disparity vector (280). Video decoder 30 may use (e.g., set) the disparity vector as a disparity vector for a current block of the video data without using a median filtering process on multiple disparity motion vectors (282). In the example of FIG. 9B, the current block is coded in either a skip mode or a direct mode. Furthermore, video decoder 30 (e.g., summer 180 of video decoder 30) may determine pixel values for the current block (284).

The following paragraphs provide additional examples in accordance with one or more techniques of this disclosure.

Example 1

A method of encoding video data according to any of the embodiments disclosed herein.

Example 2

A method of decoding video data according to any of the embodiments disclosed herein.

Example 3

A computer readable medium having stored thereon instructions which when executed perform any of the methods of examples 1 to 2.

Example 4

A method of coding video data for 3D-AVC, the method comprising: determining a disparity vector for a current block by checking one or more spatial neighboring block first, rather than temporal neighboring blocks, for neighboring block based disparity vector derivation (NBDV).

Example 6

The method of example 5, further comprising: in one or both of a skip mode and a direct mode, directly using the disparity vector, as the result of the NBDV, for the current block without further checking spatial neighboring blocks.

Example 7

The method of example 6, wherein directly using the disparity vector comprises not using median filtering.

Example 8

The method of example 5, further comprising: when accessing a depth map is disallowed, setting the disparity vector for skip/direct mode equal to the NBDV result.

Example 9

The method of example 5, further comprising:
when accessing a depth map is allowed, setting the disparity vector for skip/direct mode to at least one of: the disparity vector of the NBDV-R process; if the disparity vector of the NBDV process is from a spatial neighboring block, it is set to the disparity vector of the NBDV process, otherwise it is set to the disparity vector of the NBDV-R process; and the disparity vector of the NBDV process.

Example 10

A method of coding video data for 3D-AVC, the method comprising: during skip/direct mode, only when the disparity vector of the NBDV process is from a disparity motion vector of a temporal neighboring block of a current block, checking spatial neighboring blocks in a certain order.

Example 11

The method of example 10, further comprising: if a spatial neighboring block being checked includes an available disparity motion vector, setting the available disparity motion vector to the disparity vector of the current block; if no disparity motion vector is found from the spatial neighboring blocks, using the result of the NBDV or the NBDV-R for the current block.

Example 12

The method of example 10, further comprising if there are more than one spatial neighboring blocks that includes a disparity motion vector, deriving the disparity motion vector/disparity vector with a mathematic function from available ones and used for current block.

Example 13

A method of coding video data for 3D-AVC, the method comprising: when the current block is coded using a skip/direct mode, directly using the disparity vector from NBDV or NBDV-R instead of further checking spatial blocks.

Example 14

The method of any combination or permutation of examples 5-13.

Example 15

The method of any combination or permutation of examples 5-13, wherein the method is performed by a video decoder.

Example 16

The method of any combination or permutation of examples 5-13, wherein the method is performed by a video encoder.

Example 17

A video coding device comprising a video coder configured to implement the method of any combination or permutation of examples 5-14.

Example 18

The video coding device of example 17, wherein the video coder comprises a video decoder.

Example 19

The video coding device of example 17, wherein the video coder comprises a video encoder.

Example 20

The video coding device of any of examples 17-19, wherein the video coding device comprises at least one of: an integrated circuit; a microprocessor; and a wireless communication device that includes the video coder.

Example 21

An apparatus comprising means for implementing the method of any of examples 5-14.

Example 22

A computer-readable storage medium having stored thereon instructions that, when executed by a processor of a device for coding video data, cause the device to perform the method of any of examples 5-14.

Example 23

An apparatus for video coding, the apparatus comprising: means for determining a disparity vector for a current block by checking spatial neighboring block first, rather than temporal neighboring blocks, for neighboring block based disparity vector derivation (NBDV).

Example 24

An apparatus for video coding, the apparatus comprising: means for checking spatial neighboring blocks in a certain order during skip/direct mode, only when the disparity vector of the NBDV process is from a disparity motion vector of a temporal neighboring block of a current block.

Example 25

An apparatus for video coding, the apparatus comprising: when the current block is coded with skip/direct, means for directly using the disparity vector from NBDV or NBDV-R instead of further checking spatial blocks and potentially utilizing median filtering.

Example 26

An apparatus comprising: a memory storing instructions; and one or more processors which upon execution of the instructions are configured to perform the method of any combination or permutation of examples 1-13.

Example 27

The apparatus of example 26, wherein the apparatus comprises a video decoder.

Example 28

The apparatus of example 26, wherein the apparatus comprises a video encoder.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, embodiments disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various examples have been described. These and other examples are within the scope of the following claims.

What is claimed is:

1. A method of decoding video data, the method comprising:
  based on access to a depth map being allowed, determining a macroblock-level disparity vector for a current block of the video data without using a median filtering process on multiple disparity motion vectors, the current block being a macroblock and the current block being coded using either a P-skip mode, a B-skip mode, a B-16×16 direct mode, or the current block being an 8×8 block and the current block being coded using a B-8×8 direct mode, and determining the disparity vector for the current block comprises performing a neighboring-block based disparity vector (NBDV) refinement (NBDV-R) process to determine the disparity vector for the current block, the NBDV-R process comprising performing a NBDV derivation process to determine the disparity vector for the current block and refining the disparity vector for the current block by accessing a corresponding depth block in the depth map, the NBDV derivation process comprising checking neighboring blocks for a disparity motion vector and converting the disparity motion vector to the disparity vector for the current block, the disparity motion vector being a motion vector pointing to an inter-view reference picture;

using the disparity vector for the current block to determine a reference block in a reference view; and determining pixel values for the current block based on the reference block.

2. The method of claim 1, wherein the current block is a first block, the method further comprising:

based on access to the depth map not being allowed, setting a disparity vector for a second block to a disparity vector determined by the NBDV process.

3. The method of claim 1, wherein performing the NBDV derivation process comprises: checking one or more spatial neighboring blocks for disparity motion vectors and then checking one or more temporal neighboring blocks for disparity motion vectors.

4. A method of encoding video data, the method comprising:

based on access to a depth map being allowed, determining a macroblock-level disparity vector for a current block of the video data without using a median filtering process on multiple disparity motion vectors, the current block being a macroblock and the current block being coded using either a P-skip mode, a B-skip mode, a B-16×16 direct mode, or the current block being an 8×8 block and the current block being coded using a B-8×8 direct mode, and determining the disparity vector for the current block comprises performing a neighboring-block based disparity vector (NBDV) refinement (NBDV-R) process to determine the disparity vector for the current block, the NBDV-R process comprising performing a NBDV derivation process to determine the disparity vector for the current block and refining the disparity vector for the current block by accessing a corresponding depth block in the depth map, the NBDV derivation process comprising checking neighboring blocks for a disparity motion vector and converting the disparity motion vector to the disparity vector for the current block, the disparity motion vector being a motion vector pointing to an inter-view reference picture;

using the disparity vector for the current block to determine a reference block in a reference view; and using the reference block to generate an encoded version of the current block.

5. The method of claim 4, wherein the current block is a first block, the method further comprising:

based on access to the depth map not being allowed, setting a disparity vector for a second block to a disparity vector determined by the NBDV process.

6. The method of claim 4, wherein performing the NBDV derivation process comprises: checking one or more spatial neighboring blocks for disparity motion vectors and then checking one or more temporal neighboring blocks for disparity motion vectors.

7. A device for coding video data, the device comprising:

a memory configured to store decoded video blocks of the video data; and one or more processors configured to:

based on access to a depth map being allowed, determine a macroblock-level disparity vector for a current block of the video data without using a median filtering process on multiple disparity motion vectors, the current block being a macroblock and the current block being coded using either a P-skip mode, a B-skip mode, a B-16×16 direct mode, or the current block being an 8×8 block and the current block being coded using a B-8×8 direct mode, wherein to determine the disparity vector for the current block, the one or more processors perform a neighboring-block based disparity vector (NBDV) refinement (NBDV-R) process to determine the disparity vector for the current block, the NBDV-R process comprising performing a NBDV derivation process to determine the disparity vector for the current block and refining the disparity vector for the current block by accessing a corresponding depth block in the depth map, the NBDV derivation process comprising checking neighboring blocks for a disparity motion vector and converting the disparity motion vector to the disparity vector for the current block, the disparity motion vector being a motion vector pointing to an inter-view reference picture; and use the disparity vector for the current block to determine a reference block in a reference view; and one or more of the following:

determine pixel values for the current block based on the reference block; or use the reference block to generate an encoded version of the current block.

8. The device of claim 7, wherein the current block is a first block and the one or more processors are configured to:

based on access to the depth map not being allowed, set a disparity vector for a second block to a disparity vector determined by the NBDV process.

9. The device of claim 7, wherein as part of performing the NBDV derivation process, the one or more processors check one or more spatial neighboring blocks for disparity motion vectors and then check one or more temporal neighboring blocks for disparity motion vectors.

10. A device for coding video data, the device comprising:

means for determining, based on access to a depth map being allowed, a macroblock-level disparity vector for a current block of the video data without using a median filtering process on multiple disparity motion vectors, the current block being a macroblock and the current block being coded using either a P-skip mode, a B-skip mode, a B-16×16 direct mode, or the current block being an 8×8 block and the current block being coded using a B-8×8 direct mode, and determining the disparity vector for the current block comprises performing a neighboring-block based disparity vector (NBDV) refinement (NBDV-R) process to determine the disparity vector for the current block, the NBDV-R process comprising performing a NBDV derivation process to determine the disparity vector for the current block and refining the disparity vector for the current block by accessing a corresponding depth block in the depth map, the NBDV derivation process comprising checking neighboring blocks for a disparity motion vector and converting the disparity motion vector to the disparity vector for the current block, the disparity motion vector being a motion vector pointing to an inter-view reference picture; and means for using the disparity vector for the current block of video data to determine a reference block in a reference view; and one or more of the following:

means for determining pixel values for the current block based on the reference block; or means for using the reference block to generate an encoded version of the current block.

11. The method of claim 1, the method being executable on a wireless communication device, wherein the device comprises:

a memory configured to store the video data;

a processor configured to execute instructions to process the video data stored in said memory;

a receiver configured to receive a bitstream that comprises a sequence of bits that forms a representation of coded pictures of the video data, the current block being a block of a coded picture of the video data.

12. The method of claim 11, wherein the wireless communication device is a cellular telephone and the bitstream is received by the receiver and modulated according to a cellular communication standard.

13. The device of claim 7, wherein the device is a wireless communication device, further comprising at least one of:

a transmitter configured to transmit a bitstream that comprises a sequence of bits that forms a representation of coded pictures of the video data, the current block being a block of a coded picture of the video data; or a receiver configured to receive the bitstream.

14. The device of claim 13, wherein the wireless communication device is a cellular telephone and the bitstream is transmitted or received by the transmitter or receiver and modulated according to a cellular communication standard.

* * * * *